United States Patent
Ioannou et al.

(10) Patent No.: US 10,613,784 B2
(45) Date of Patent: *Apr. 7, 2020

(54) ADAPTIVE ASSIGNMENT OF OPEN LOGICAL ERASE BLOCKS TO DATA STREAMS

(71) Applicant: International Business Machines Corporation, Armonk, NY (US)

(72) Inventors: Nikolas Ioannou, Zurich (CH); Roman A. Pletka, Uster (CH); Sasa Tomic, Kilchberg (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/788,577

(22) Filed: Oct. 19, 2017

(65) Prior Publication Data

US 2018/0046376 A1 Feb. 15, 2018

Related U.S. Application Data

(63) Continuation of application No. 14/866,315, filed on Sep. 25, 2015, now Pat. No. 9,886,208.

(51) Int. Cl.
*G06F 3/06* (2006.01)
*G06F 12/02* (2006.01)

(52) U.S. Cl.
CPC .......... *G06F 3/064* (2013.01); *G06F 3/0613* (2013.01); *G06F 3/0616* (2013.01);
(Continued)

(58) Field of Classification Search
None
See application file for complete search history.

(56) References Cited

U.S. PATENT DOCUMENTS 7,941,591 B2 5/2011 Aviles
8,185,778 B2 5/2012 Kilzer et al.
(Continued)

FOREIGN PATENT DOCUMENTS

CN 102609360 A 7/2012
EP 1521268 A2 4/2005
(Continued)

OTHER PUBLICATIONS

Chung et al., "A survey of Flash Translation Layer," Journal of Systems Architecture 55, 2009, pp. 332-343.
(Continued)

*Primary Examiner* — Glenn Gossage
(74) *Attorney, Agent, or Firm* — Zilka-Kotab, P.C.

(57) ABSTRACT

A computer-implemented method is provided, which includes: assigning data having a first heat to a first data stream, assigning data having a second heat to a second data stream, determining an anticipated throughput of each of the first and second data streams, assigning a first number of logical erase blocks of non-volatile memory to the first data stream based on the anticipated throughput of the first data stream, and assigning a second number of logical erase blocks of non-volatile memory to the second data stream based on the anticipated throughput of the second data stream. Wear-leveling may be performed on open logical erase blocks, including assigning at least some open of the logical erase blocks to a queue. Open logical erase blocks having health values less than a health value of other logical erase blocks by a predetermined amount may be skipped over during the assigning of open logical erase blocks to the queue. The number of logical erase blocks assigned to the data streams may be statically assigned, or may be adjusted dynamically based on at least one of temporal stream throughput and stream stall events.

19 Claims, 10 Drawing Sheets

(52) U.S. Cl.
CPC .......... *G06F 3/0643* (2013.01); *G06F 3/0679* (2013.01); *G06F 12/0246* (2013.01); *G06F 2212/7205* (2013.01); *G06F 2212/7211* (2013.01)

(56) References Cited

U.S. PATENT DOCUMENTS

| | | |
|---|---|---|
| 8,285,918 B2 | 10/2012 | Maheshwari |
| 8,327,110 B2 | 12/2012 | Yamamoto |
| 8,402,242 B2 | 3/2013 | Hu et al. |
| 8,463,983 B2 | 6/2013 | Eleftheriou et al. |
| 8,756,375 B2 | 6/2014 | Flynn |
| 8,838,935 B2 | 9/2014 | Hinton et al. |
| 9,886,208 B2 | 2/2018 | Ioannou et al. |
| 2004/0158675 A1 | 8/2004 | Hirose |
| 2008/0034154 A1 | 2/2008 | Lee et al. |
| 2009/0164724 A1 | 6/2009 | Hirose |
| 2010/0262687 A1 | 10/2010 | Shen et al. |
| 2011/0066788 A1 | 3/2011 | Eleftheriou et al. |
| 2011/0087855 A1 | 4/2011 | Frost et al. |
| 2011/0093648 A1 | 4/2011 | Belluomini et al. |
| 2011/0213919 A1 | 9/2011 | Frost et al. |
| 2011/0264843 A1 | 10/2011 | Haines et al. |
| 2012/0023144 A1 | 1/2012 | Rub |
| 2012/0079232 A1 | 3/2012 | Hinton et al. |
| 2012/0166709 A1 | 6/2012 | Chun |
| 2012/0284587 A1 | 11/2012 | Yu et al. |
| 2012/0297122 A1 | 11/2012 | Gorobets et al. |
| 2012/0317337 A1 | 12/2012 | Johar et al. |
| 2013/0024609 A1 | 1/2013 | Gorobets et al. |
| 2013/0054873 A1 | 2/2013 | Belluomini et al. |
| 2013/0061019 A1 | 3/2013 | Fitzpatrick et al. |
| 2013/0159626 A1 | 6/2013 | Katz et al. |
| 2013/0185526 A1 | 7/2013 | de la Iglesia et al. |
| 2013/0205183 A1 | 8/2013 | Fillingim et al. |
| 2013/0332668 A1 | 12/2013 | Diep et al. |
| 2014/0068157 A1 | 3/2014 | Makuni et al. |
| 2014/0075099 A1 | 3/2014 | Ooneda |
| 2014/0095775 A1 | 4/2014 | Talagala et al. |
| 2014/0223094 A1 | 8/2014 | Baderdinni et al. |
| 2014/0304454 A1 | 10/2014 | Ellis et al. |
| 2014/0351526 A1 | 11/2014 | Peterson |
| 2015/0052395 A1 | 2/2015 | Wipfel |
| 2015/0177995 A1 | 6/2015 | Camp et al. |
| 2015/0186270 A1 | 7/2015 | Peng et al. |
| 2015/0220385 A1 | 8/2015 | Wood et al. |
| 2016/0004464 A1 | 1/2016 | Shen |
| 2016/0092352 A1 | 3/2016 | Camp et al. |
| 2016/0170870 A1 | 6/2016 | Camp et al. |
| 2016/0179386 A1 | 6/2016 | Zhang |
| 2016/0179678 A1 | 6/2016 | Camp et al. |
| 2016/0266792 A1 | 9/2016 | Amaki et al. |
| 2016/0378400 A1 | 12/2016 | Yang et al. |
| 2017/0090759 A1 | 3/2017 | Ioannou et al. |
| 2017/0255399 A1* | 9/2017 | Yang ..................... G06F 3/0616 |
| 2017/0286289 A1* | 10/2017 | Chu ................... G06F 12/0246 |

FOREIGN PATENT DOCUMENTS

| | | |
|---|---|---|
| JP | 2004185199 A | 7/2004 |
| KR | 20130048261 A | 5/2013 |
| WO | 2012148828 A2 | 11/2012 |

OTHER PUBLICATIONS

Deng et al., "Architectures and optimization methods offlash memory based storage system," Journal of Systems Architecture 57, 2011, pp. 214-227.

Dirik et al., "The Performance of PC Solid-State Disks (SSDs) as a Function of Bandwidth, Concurrency, Device Architecture, and System Organization," ISCA'09, Jun. 20-24, 2009, pp. 279-289.

Hu et al., "Container Marking: Combining Data Placement, Garbage Collection and Wear Levelling for Flash," IBM Research, May 5, 2011, pp. 1-11.

Hu et al., "Write Amplification Analysis in Flash-Based Solid State Drives," SYSTOR'09, May 4-6, 2009, pp. 1-9.

Hu et al., "The Fundamental Limit of Flash Random Write Performance: Understanding, Analysis and Performance Modelling," IBM Research, Mar. 31, 2010, pp. 1-15.

Menon, "A performance Comparison of RAID-5 and Log-Structured Arrays," in Proceedings of the 4th IEEE International Symposium on High Performance Distributed Computing, 1995, pp. 167-178.

Min, C. et al., "SFS: random write considered harmful in solid state drives," FAST'12 Proceedings of the 10th USENIX conference on File and Storage Technologies, Feb. 14, 2012, pp. 1-16.

Patterson et al., "A Case for Redundant Arrays of Inexpensive Disks (RAID)," Proceedings of the 1988 ACM SIGMOD International Conference on Management of Data, Jun. 1988, pp. 3-14.

Ramachandran, et al., "Dynamic Data Fusion for Future Sensor Networks," ACM Transactions on Sensor Networks (TOSN), No. 3, 2006, pp. 404-443.

Anonymous, "Method for better performance by smart garbage collector invocation on SSD in high reliability environment," ip.com, No. 000223784, Nov. 29, 2012, pp. 1-6.

Rodeh, O. et. al., "Visualizing Block IO Workloads," IBM Research Report, Oct. 25, 2013, pp. 1-28.

Non-Final Office Action from U.S. Appl. No. 14/578,195, dated Jun. 16, 2016.

Non-Final Office Action from U.S. Appl. No. 14/497,243, dated Jun. 21, 2016.

Non-Final Office Action from U.S. Appl. No. 14/566,639, dated Jul. 1, 2016.

Non-Final Office Action from U.S. Appl. No. 14/578,195, dated Dec. 15, 2016.

Notice of Allowance from U.S. Appl. No. 14/497,243, dated Dec. 21, 2016.

Non-Final Office Action from U.S. Appl. No. 14/866,315, dated Jan. 13, 2017.

Final Office Action from U.S. Appl. No. 14/866,315, dated Jun. 29, 2017.

Notice of Allowance from U.S. Appl. No. 14/866,315, dated Sep. 21, 2017.

Supplemental Notice of Allowance from U.S. Appl. No. 14/866,315, dated Nov. 27, 2017.

Wikipedia "Write Amplification," Wikipedia, Last Modified Jan. 21, 2014, Retrieved from https://en.wikipedia.org/wiki/Write_amplification, pp. 1-13.

\* cited by examiner

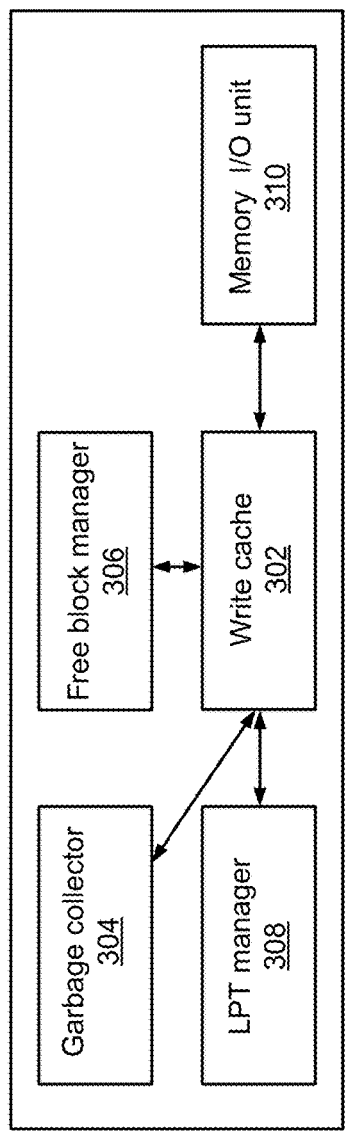
FIG. 3
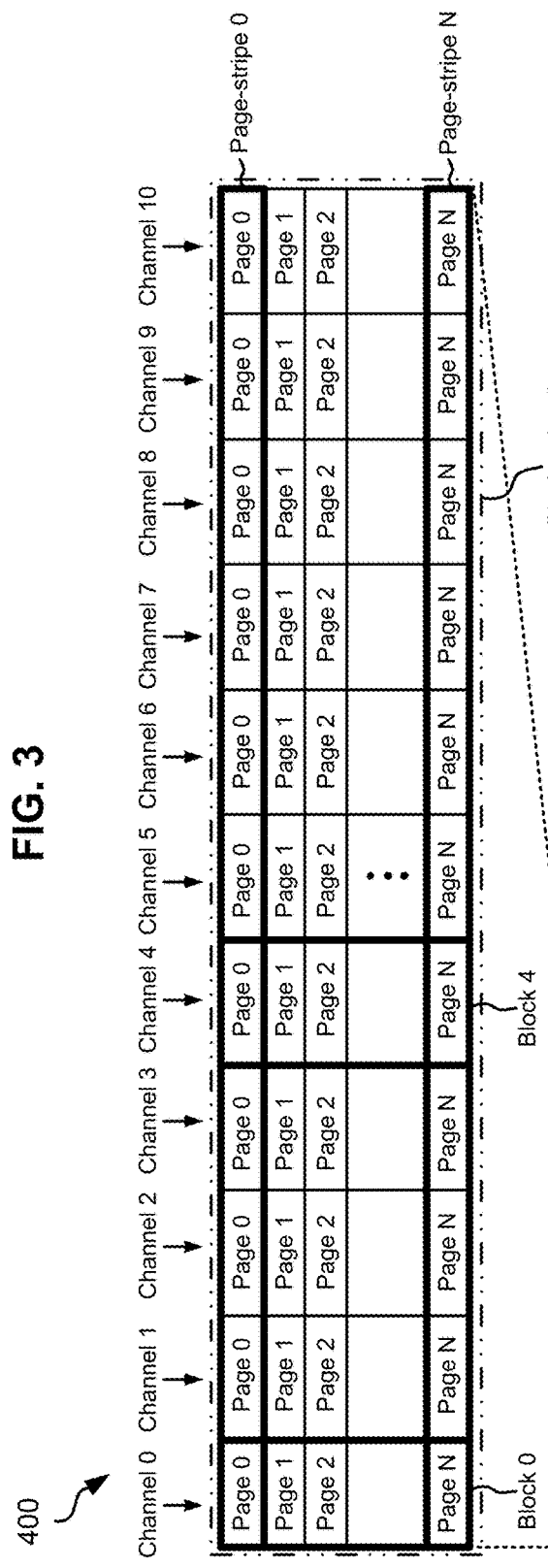
FIG. 4

ADAPTIVE ASSIGNMENT OF OPEN LOGICAL ERASE BLOCKS TO DATA STREAMS

RELATED APPLICATIONS

This application is a continuation of U.S. patent application Ser. No. 14/866,315, filed Sep. 25, 2015, now U.S. Pat. No. 9,886,208.

BACKGROUND

The present invention relates to non-volatile memory, e.g., such as NAND Flash memory, and more particularly, this invention relates to the assignment of open logical erase blocks (LEBs) to data streams.

Using Flash memory as an example, the performance characteristics of conventional NAND Flash-based solid state drives (SSDs) are fundamentally different from those of traditional hard disk drives (HDDs). Data in conventional SSDs is typically organized in pages of 4, 8, or 16 kilobyte (KB) sizes. Moreover, page read operations in SSDs are typically one order of magnitude faster than write operations and latency neither depends on the current nor the previous location of operations.

However, in Flash-based SSDs, memory locations are erased in blocks prior to being written to. The size of an erase block unit is typically 256 pages and the erase operations takes approximately one order of magnitude more time than a page program operation. Due to the intrinsic properties of NAND Flash, Flash-based SSDs write data out-of-place whereby a mapping table maps logical addresses of the written data to physical ones. This mapping table is typically referred to as the Logical-to-Physical Table (LPT).

As Flash-based memory cells exhibit read errors and/or failures due to wear or other reasons, additional redundancy may be used within memory pages as well as across memory chips (e.g., Redundant Array of Independent Disks (RAID)-5 and RAID-6 like schemes). The additional redundancy within memory pages may include error correction code (ECC) which, for example, may include Bose-Chaudhuri-Hocquenghem (BCH) codes. While the addition of ECC in pages is relatively straightforward, the organization of memory blocks into RAID-like stripes is more complex. For instance, individual blocks are retired over time which requires either reorganization of the stripes, or capacity reduction of the stripe. As the organization of stripes together with the LPT defines the placement of data, SSDs typically utilize a Log-Structured Array (LSA) architecture, which combines these two methods.

The LSA architecture relies on out-of-place writes. In this approach, a memory page overwrite will result in writing the memory page data to a new location in memory, marking the old copy of the memory page data as invalid, and then updating the mapping information. Due to the limitations of current NAND memory technology, an invalidated data location cannot be reused until the entire block it belongs to has been erased. Before erasing, though, the block undergoes garbage collection, whereby any valid data in the block is relocated to a new block. Garbage collection of a block is typically deferred for as long as possible to maximize the amount of invalidated data in block, and thus reduce the number of valid pages that are relocated, as relocating data causes additional write operations, and thereby increases write amplification.

SUMMARY

A computer-implemented method, according to one embodiment, includes: assigning data having a first heat to a first data stream, assigning data having a second heat to a second data stream, determining an anticipated throughput of each of the first and second data streams, assigning a first number of logical erase blocks of non-volatile memory to the first data stream based on the anticipated throughput of the first data stream, and assigning a second number of logical erase blocks of non-volatile memory to the second data stream based on the anticipated throughput of the second data stream.

A computer program product, according to another embodiment, includes a computer readable storage medium having program instructions embodied therewith, the program instructions readable and/or executable by a controller to cause the controller to: assign, by the controller, data having a first heat to a first data stream, assign, by the controller, data having a second heat to a second data stream, determine, by the controller, an anticipated throughput of each of the first and second data streams, assign, by the controller, a first number of logical erase blocks of non-volatile memory to the first data stream based on the anticipated throughput of the first data stream, and assign, by the controller, a second number of logical erase blocks of non-volatile memory to the second data stream based on the anticipated throughput of the second data stream.

A system, according to yet another embodiment, includes: a plurality of non-volatile random access memory blocks configured to store data, and a processor and logic integrated with and/or executable by the processor, the logic being configured to: assign data having a first heat to a first data stream, assign data having a second heat to a second data stream, determine an anticipated throughput of each of the first and second data streams, assign a first number of logical erase blocks of non-volatile memory to the first data stream based on the anticipated throughput of the first data stream, and assign a second number of logical erase blocks of non-volatile memory to the second data stream based on the anticipated throughput of the second data stream. The first and/or second number of logical erase blocks are statically assigned to each of the first and/or second data streams.

Other aspects and embodiments of the present invention will become apparent from the following detailed description, which, when taken in conjunction with the drawings, illustrate by way of example the principles of the invention.

BRIEF DESCRIPTION OF THE DRAWINGS

FIG. 3 is a system diagram, in accordance with one embodiment.

FIG. 4 is a conceptual diagram which includes a block-stripe and page-stripe, in accordance with one embodiment.

DETAILED DESCRIPTION

Figure 1:
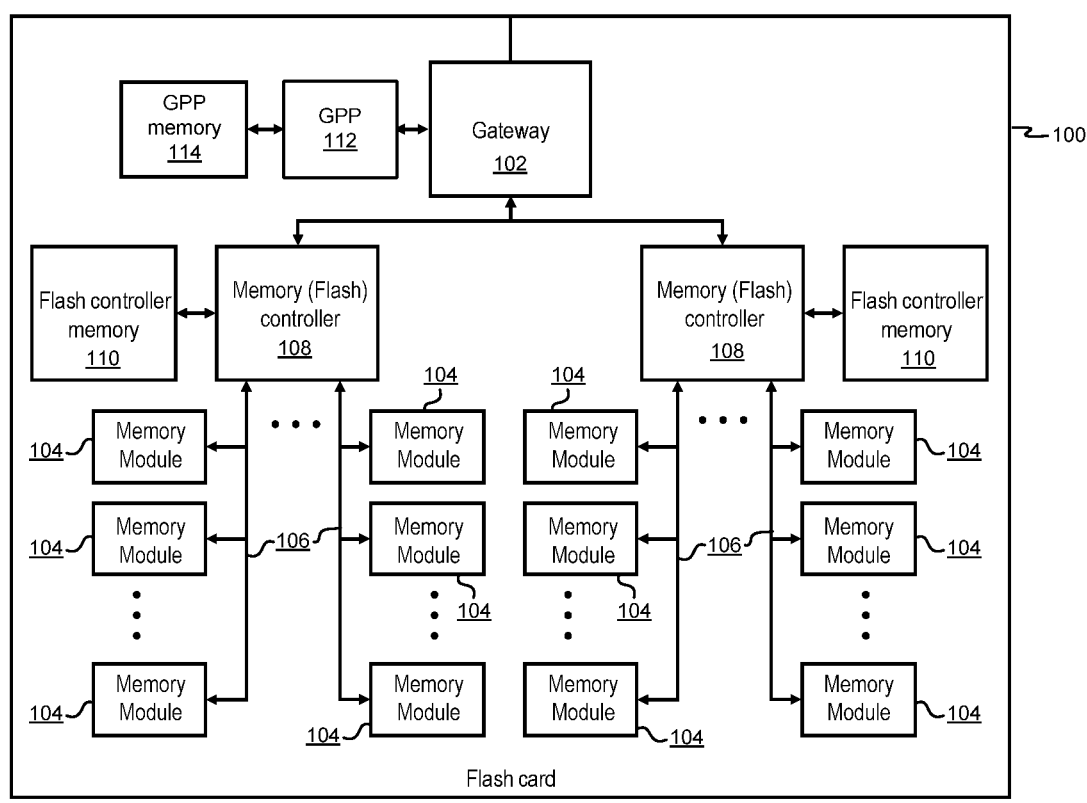
FIG. 1 is a diagram of a non-volatile memory card, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of data storage systems, as well as operation and/or component parts thereof. It should be appreciated that various embodiments herein can be implemented with a wide range of memory mediums, including for example non-volatile random access memory (NVRAM) technologies such as NAND Flash memory, NOR Flash memory, phase-change memory (PCM), magnetoresistive RAM (MRAM) and resistive RAM (RRAM). To provide a context, and solely to assist the reader, various embodiments may be described with reference to a type of non-volatile memory. This has been done by way of example only, and should not be deemed limiting on the invention defined in the claims.

In one general embodiment, a computer-implemented method includes: assigning data having a first heat to a first data stream, assigning data having a second heat to a second data stream, determining an anticipated throughput of each of the first and second data streams, assigning a first number of logical erase blocks of non-volatile memory to the first data stream based on the anticipated throughput of the first data stream, and assigning a second number of logical erase blocks of non-volatile memory to the second data stream based on the anticipated throughput of the second data stream.

In another general embodiment, a computer program product includes a computer readable storage medium having program instructions embodied therewith, the program instructions readable and/or executable by a controller to cause the controller to: assign, by the controller, data having a first heat to a first data stream, assign, by the controller, data having a second heat to a second data stream, determine, by the controller, an anticipated throughput of each of the first and second data streams, assign, by the controller, a first number of logical erase blocks of non-volatile memory to the first data stream based on the anticipated throughput of the first data stream, and assign, by the controller, a second number of logical erase blocks of non-volatile memory to the second data stream based on the anticipated throughput of the second data stream.

In yet another general embodiment, a system includes: a plurality of non-volatile random access memory blocks configured to store data, and a processor and logic integrated with and/or executable by the processor, the logic being configured to: assign data having a first heat to a first data stream, assign data having a second heat to a second data stream, determine an anticipated throughput of each of the first and second data streams, assign a first number of logical erase blocks of non-volatile memory to the first data stream based on the anticipated throughput of the first data stream, and assign a second number of logical erase blocks of non-volatile memory to the second data stream based on the anticipated throughput of the second data stream. The first and/or second number of logical erase blocks are statically assigned to each of the first and/or second data streams.

FIG. 1 illustrates a memory card 100, in accordance with one embodiment. It should be noted that although memory card 100 is depicted as an exemplary non-volatile data storage card in the present embodiment, various other types of non-volatile data storage cards may be used in a data storage system according to alternate embodiments. It follows that the architecture and/or components of memory card 100 are in no way intended to limit the invention, but rather have been presented as a non-limiting example.

Moreover, as an option, the present memory card 100 may be implemented in conjunction with features from any other embodiment listed herein, such as those described with reference to the other FIGS. However, such memory card 100 and others presented herein may be used in various applications and/or in permutations which may or may not be specifically described in the illustrative embodiments listed herein. Further, the memory card 100 presented herein may be used in any desired environment.

With continued reference to FIG. 1, memory card 100 includes a gateway 102, a general purpose processor (GPP) 112 (such as an application specific integrated circuit (ASIC), field programmable gate array (FPGA), central processing unit (CPU), etc.) connected to a GPP memory 114 (which may comprise random access memory (RAM), read-only memory (ROM), battery-backed dynamic random-access memory (DRAM), phase-change random access memory (PC-RAM), magnetoresistive random-access memory (MRAM), Spin Transfer-Torque (STT)-MRAM, etc., or a combination thereof), and a number of memory controllers 108, which include Flash controllers in the present example. Each memory controller 108 is connected to a plurality of NVRAM memory modules 104 (which may comprise NAND Flash or other non-volatile memory type(s) such as those listed above) via channels 106, the NVRAM memory modules 104 having NVRAM blocks therein. For approaches in which the NVRAM memory modules 104 are NAND Flash modules, each module may consist of one or more Flash dies. Flash dies are typically organized into 2 physical planes which can be programmed in parallel. As a consequence, physical planes from all channels may be interleaved to improve write performance.

According to various embodiments, one or more of the controllers 108 may be or include one or more processors, and/or any logic for controlling any subsystem of the memory card 100. For example, the controllers 108 typically control the functions of NVRAM memory modules 104 such as, data writing, data recirculation, data reading, etc. The controllers 108 may operate using logic known in the art, as well as any logic disclosed herein, and thus may be considered as a processor for any of the descriptions of non-volatile memory included herein, in various embodiments.

Moreover, the controller 108 may be configured and/or programmable to perform or control some or all of the methodology presented herein. Thus, the controller 108 may be considered to be configured to perform various operations by way of logic programmed into one or more chips, modules, and/or blocks; software, firmware, and/or other instructions being available to one or more processors; etc., and combinations thereof.

Referring still to FIG. 1, each memory controller 108 is also connected to a controller memory 110 which preferably includes a cache which replicates a non-volatile memory structure according to the various embodiments described herein. However, depending on the desired embodiment, the controller memory 110 may be battery-backed DRAM, phase-change random access memory PC-RAM, MRAM, STT-MRAM, etc., or a combination thereof.

Figure 2:
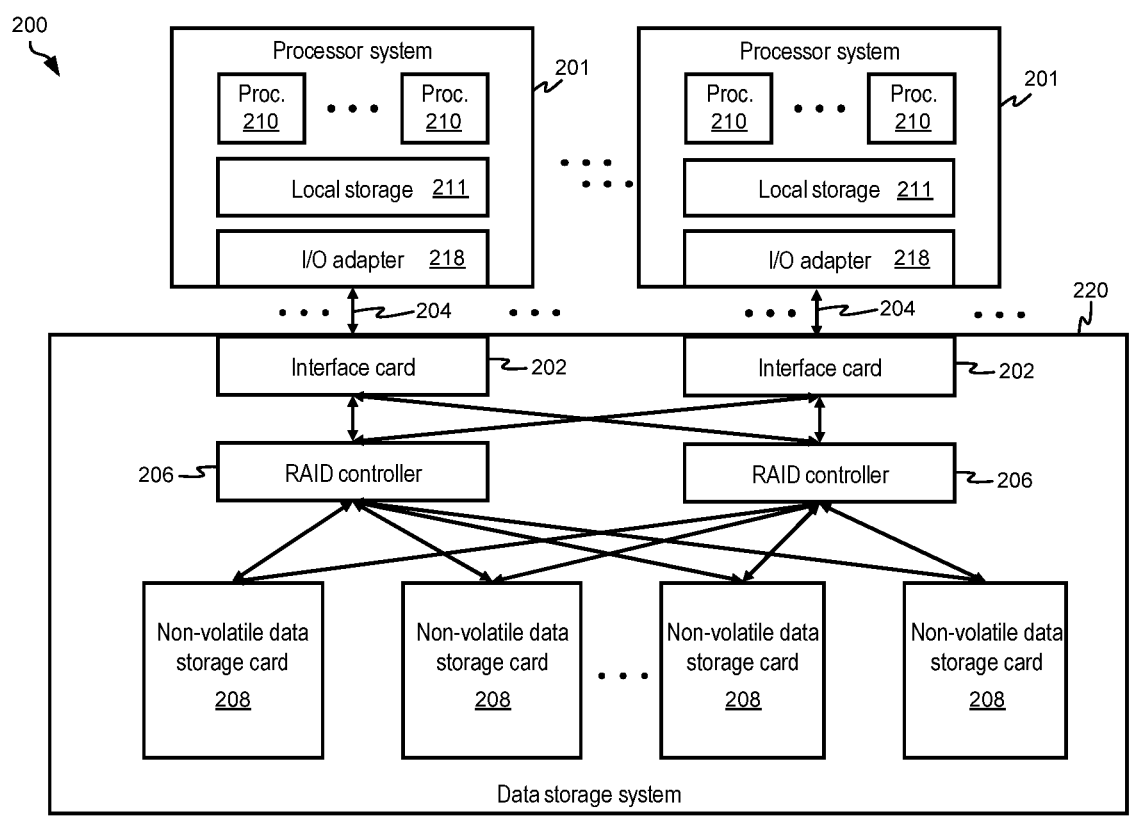
FIG. 2 is a diagram of a data storage system architecture, in accordance with one embodiment.

As previously mentioned, memory card 100 may be implemented in various types of data storage systems, depending on the desired embodiment. FIG. 2 illustrates a data storage system architecture 200 according to an exemplary embodiment which is in no way intended to limit the invention. Moreover, it should be noted that the data storage system 220 of FIG. 2 may include various components found in the embodiment of FIG. 1.

Looking to FIG. 2, the data storage system 220 comprises a number of interface cards 202 configured to communicate via input/output (I/O) interconnections 204 to one or more processor systems 201. The data storage system 220 may also comprise one or more RAID controllers 206 configured to control data storage in a plurality of non-volatile data storage cards 208. The non-volatile data storage cards 208 may comprise NVRAM, Flash memory cards, RAM, ROM, and/or some other known type of non-volatile memory.

The I/O interconnections 204 may include any known communication protocols, such as Fiber Channel (FC), FC over Ethernet (FCoE), Infiniband, Internet Small Computer System Interface (iSCSI), Transport Control Protocol/Internet Protocol (TCP/IP), Peripheral Component Interconnect Express (PCIe), etc., and/or any combination thereof.

The RAID controller(s) 206 in the data storage system 220 may perform a parity scheme similar to that employed by RAID-5, RAID-10, or some other suitable parity scheme, as would be understood by one of skill in the art upon reading the present descriptions.

Each processor system 201 comprises one or more processors 210 (such as CPUs, microprocessors, etc.), local data storage 211 (e.g., such as RAM 1014 of FIG. 10, ROM 1016 of FIG. 10, etc.), and an I/O adapter 218 configured to communicate with the data storage system 220.

Referring again to FIG. 1, memory controllers 108 and/or other controllers described herein (e.g., RAID controllers 206 of FIG. 2) may be able to perform various functions on stored data, depending on the desired embodiment. Specifically, memory controllers may include logic configured to perform any one or more of the following functions, which are in no way intended to be an exclusive list. In other words, depending on the desired embodiment, logic of a storage system may be configured to perform additional or alternative functions, as would be appreciated by one skilled in the art upon reading the present description.

Garbage Collection

Garbage collection in the context of SSD memory controllers of the present description may include the process of identifying blocks of data to be reclaimed for future usage and relocating all pages that are still valid therein. Moreover, depending on the specific controller and/or the respective garbage collection unit of operation, LEBs may be identified for being reclaimed and/or relocated. Typically, one LEB corresponds to one block stripe, but alternative implementations may consider a fixed number of block stripes building a LEB as well.

A physical "block" represents a minimal unit that may be erased on non-volatile memory, e.g., such as NAND Flash memory, and thereby prepared for writing data thereto. However, a typical garbage collection unit of operation is often a multiple of the physical blocks of non-volatile memory, and is also referred to herein as a LEB. This is due to the fact that typically RAID-like parity information is added in LEBs. Therefore, in case of a page or block failure, data can only be rebuilt when all blocks in the LEB are still holding data. Accordingly, the individual blocks from the garbage collection unit can only be erased either individually or in a single unit once all still valid data from all blocks in the LEB has been relocated successfully to new locations. Hence, the full garbage collection units are garbage-collected as a single unit. Moreover, the size of the LEB directly affects the garbage collection induced write amplification. The larger the LEB, the more likely it becomes that unrelated data are stored together in the LEB, and therefore more of the LEB data may have to be relocated upon garbage collection selection.

Frequently, blocks from different dies and/or Flash channels are grouped together, such that blocks from the same group can be read or written in parallel, thereby increasing overall bandwidth. It is also possible to combine the previous two methods, and to compose RAID stripes using blocks from different Flash channels that can be accessed in parallel.

It should also be noted that an LEB may include any multiple of the physical memory block, which is a unit of physical erasure. Moreover, the organization of memory blocks into LEBs not only allows for adding RAID-like parity protection schemes among memory blocks from different memory chips, memory planes and/or channels but also allows for significantly enhancing performance through higher parallelism. For instance, multiple non-volatile memory blocks may be grouped together in a RAID stripe. As will be appreciated by one skilled in the art upon reading the present description, RAID schemes generally improve reliability and reduce the probability of data loss.

According to an exemplary embodiment, which is in no way intended to limit the invention, memory controllers (e.g., see 108 of FIG. 1) may internally perform garbage collection. As previously mentioned, garbage collection may include selecting a LEB to be relocated, after which all data that is still valid on the selected LEB may be relocated (e.g., moved). After the still valid data has been relocated, the LEB may be erased and thereafter, used for storing new data. The amount of data relocated from the garbage collected LEB determines the write amplification. Moreover, an efficient way to reduce the write amplification includes implementing heat segregation.

Heat Segregation

Heat segregation is an efficient method to significantly reduce write amplification for a large number of real-world workloads. In the present context, the "heat" of data refers to the rate (e.g., frequency) at which the data is updated (e.g., rewritten with new data). Memory blocks that are considered "hot" tend to have a frequent update rate, while memory blocks that are considered "cold" have an update rate slower than hot blocks.

The heat segregation process includes marking logical pages with a given heat and proactively grouping logical pages of the same and/or similar heats into the same LEBs. Furthermore, data of same or similar heat are placed into LEBs belonging to a common "stream". One of the results of heat segregation is that LEBs store together data that have similarities in terms of update frequency, e.g., rather than simply storing data to the first available open LEB.

The temperature of a chunk of data in the context of heat-segregation is most useful when the chunk is categorized relative to the updates of other chunks in a device. According to an example, which is in no way intended to limit the invention, even if a certain chunk of data is overwritten ten times in one day, but then is not overwritten for a week, that chunk of data may still be correctly categorized as having a "hot" heat classification in an instance when no other chunks of data have been updated during the same period of time.

It should be noted that the number of read requests to and/or read operations performed on a memory block may not come into play when determining the heat of the memory block and/or defining streams for some embodiments. For example, if data is frequently read from a particular memory block, the high read frequency does not necessarily mean that memory block will also have a high update rate. Rather, a high frequency of read operations performed on a given memory block may denote an importance, value, type, etc. of the data stored in the memory block. Thus, in some instances, higher level information may be used to separate file system meta-data from the actual data.

By grouping memory blocks of the same and/or similar heat values, heat segregation may be achieved. In particular, heat segregating methods may group hot memory pages together in certain memory blocks while cold memory pages are grouped together in separate memory blocks. Thus, a heat segregated LEB tends to be occupied by either hot or cold data.

The merit of heat segregation is two-fold. First, performing a garbage collection process on a hot memory block will prevent triggering the relocation of cold data as well. In the absence of heat segregation, updates to hot data, which are performed frequently, also result in the undesirable relocations of all cold data collocated on the same LEB as the hot data being relocated. Therefore the write amplification incurred by performing garbage collection is much lower for embodiments implementing heat segregation.

Secondly, the relative heat of data can be utilized for wear leveling purposes. For example, hot data may be placed in healthier (e.g., younger) memory blocks, while cold data may be placed on less healthy (e.g., older) memory blocks relative to those healthier memory blocks. Thus, the rate at which relatively older blocks are exposed to wear is effectively slowed, thereby improving the overall endurance of a given data storage system implementing heat segregation.

Several parameters may be adjusted to increase efficiency when implementing heat segregation which include, but are not limited to, the granularity at which heat is tracked (e.g., size of logical pages, Flash blocks, garbage collection units, etc.), resolution of heat tracking, grouping of data into streams, etc. While fine granularity and the resolution of heat tracking may be relatively straightforward to implement, the difficulty lies in the segregation of streams, through the use of the heat-tracking and other available information.

According to one approach, an n-bit saturating counter may be implemented in the LPT table for the LPT entries (e.g., for each logical page). It is apparent that a 3-bit counter results in a resolution of 8 different heat values, and so forth. This approach may be desirable when the LPT entries have unused bits, for example due to byte alignment requirements for memory accesses. Alternatively, heat may be tracked per Flash block, per garbage collection unit, etc. Accordingly, even larger numbers of heat levels may be achieved.

Write Allocation

Write allocation includes placing data of write operations into free locations of open LEBs. As soon as all pages in a LEB have been written, the LEB is closed and placed in a pool holding occupied LEBs. Typically, LEBs in the occupied pool become eligible for garbage collection. The number of open LEBs is normally limited and any LEB being closed may be replaced, either immediately or after some delay, with a fresh LEB that is being opened.

During performance, garbage collection may take place concurrently with user write operations. For example, as a user (e.g., a host) writes data to a device, the device controller may continuously perform garbage collection on LEBs with invalid data to make space for the new incoming data pages. As mentioned above, the LEBs having the garbage collection being performed thereon will often have some pages that are still valid at the time of the garbage collection operation; thus, these pages are preferably relocated (e.g., written) to a new LEB.

Again, the foregoing functions are in no way intended to limit the capabilities of any of the storage systems described and/or suggested herein. Rather, the aforementioned functions are presented by way of example, and depending on the desired embodiment, logic of a storage system may be configured to perform additional or alternative functions, as would be appreciated by one skilled in the art upon reading the present description.

Referring now to FIG. 3, a system 300 is illustrated in accordance with one embodiment. As an option, the present system 300 may be implemented in conjunction with features from any other embodiment listed herein, such as those described with reference to the other FIGS. However, such system 300 and others presented herein may be used in various applications and/or in permutations which may or may not be specifically described in the illustrative embodiments listed herein. Further, the system 300 presented herein may be used in any desired environment, e.g., in combination with a controller.

As illustrated, system 300 includes a write cache 302 which is coupled to several other components, including garbage collector 304. As previously mentioned, garbage collector 304 may be used to free LEB units by relocating valid data and providing non-volatile memory blocks to be erased for later reuse. Thus the garbage collector 304 may reclaim blocks of consecutive physical space, depending on the desired embodiment. According to an exemplary embodiment, block erase units may be used to keep track of and/or complete the erase of non-volatile memory blocks handed over by the garbage collector 304.

Write cache 302 is also coupled to free block manager 306 which may keep track of free non-volatile memory blocks after they have been erased. Moreover, as would be appreciated by one of ordinary skill in the art upon reading the present description, the free block manager 306 may build free stripes of non-volatile memory blocks from different lanes (e.g., block-stripes) using the erased free non-volatile memory blocks.

Referring still to FIG. 3, write cache 302 is coupled to LPT manager 308 and memory I/O unit 310. The LPT manager 308 maintains the logical-to-physical mappings of logical addresses to physical pages in memory. According to an example, which is in no way intended to limit the invention, the LPT manager 308 may maintain the logical-to-physical mappings of 4 KiB (kibibyte) logical addresses. The memory I/O unit 310 communicates with the memory chips in order to perform low level operations, e.g., such as reading one or more non-volatile memory pages, writing a non-volatile memory page, erasing a non-volatile memory block, etc.

To better understand the distinction between block-stripes and page-stripes as used herein, FIG. 4 is a conceptual diagram 400, in accordance with one embodiment. LEBs are built from block stripes and typically a single block stripe is used to build a LEB. However, alternative embodiments may use multiple block stripes to form an LEB. As an option, the present conceptual diagram 400 may be implemented in conjunction with features from any other embodiment listed herein, such as those described with reference to the other FIGS. However, such conceptual diagram 400 and others presented herein may be used in various applications and/or in permutations which may or may not be specifically described in the illustrative embodiments listed herein. Further, the controller conceptual diagram 400 presented herein may be used in any desired environment. Thus, the exemplary non-volatile memory controller conceptual diagram 400 of FIG. 4 may be implemented in a cache architecture. However, depending on the desired embodiment, the conceptual diagram 400 of FIG. 4 may be implemented in defining the organization of data stored in non-volatile memory. Accordingly, both implementations are described in turn below.

Non-Volatile Memory

Looking now to FIG. 4, the conceptual diagram 400 includes a set of M+1 aggregated planes labeled "Plane 0" through "Plane M". An aggregated plane consists of all physical planes with the same plane index on different channels, which is also referred to herein simply as plane. When implemented with data stored in non-volatile memory, each physical plane on a channel may include a large set of blocks, e.g., typically on the order of 1024, 2048 or more. Moreover, one or more physical planes may also include several additional blocks which may be used as replacement blocks for bad blocks (e.g., blocks performing poorly, blocks having undesirable characteristics, etc.).

In each plane of non-volatile memory, a single block from each channel may form a respective block-stripe. It follows that a number of block-stripes supported by a given embodiment of non-volatile memory may be determined by the number of blocks per plane and the number of planes.

In the exploded view of Plane 0, the conceptual diagram 400 further illustrates a single block-stripe (Block-stripe 0) out of the set of block-stripes supported in the remainder of the planes. Block-stripe 0 of plane 0 is shown as including 11 blocks, one block from each channel labeled "Channel 0" through "Channel 10". It should be noted that the association of blocks to block-stripe can change over time as block-stripes are typically dissolved after they have been garbage collected. Erased blocks may be placed in free block pools, whereby new block-stripes are assembled from blocks in the free block pools when write allocation requests fresh block-stripes. For example, looking to conceptual diagram 400, Block 10 from Channel 0 and Block 41 from Channel 4 are currently associated with the illustrated Block-stripe 0 of Plane 0. Furthermore, the illustrated Block-stripe 0 holds N+1 page-stripes and each block therefore holds N+1 pages labeled "Page 0" through "Page N".

Cache Architecture

Referring still to FIG. 4, each block of pages illustrated in the exploded view of Plane 0 may constitute a unique block when implemented in a cache architecture. Similarly, each channel may correspond to a single, individual block. For example, looking to conceptual diagram 400, Block 0 includes all pages (Page 0 through Page N) in Channel 0 while Block 4 corresponds to all pages in Channel 4, and so on.

In the context of a memory controller, e.g., which may be capable of implementing RAID at the channel level, a block-stripe is made up of multiple blocks which amount to a stripe of blocks. Looking still to FIG. 4, the multiple blocks of Plane 0 constitute Block-stripe 0. While all blocks in a block-stripe typically belong to the same plane, in some embodiments one or more blocks of a block-stripe may belong to different planes. It follows that each plane may include a block-stripe. Thus, according to an illustrative embodiment, Block 0 through Block 10 may constitute a block-stripe.

Regardless of whether the conceptual diagram 400 of FIG. 4 is implemented with non-volatile memory and/or a cache architecture, in different embodiments, the number of pages in each block and/or the number of channels in each plane may vary depending on the desired embodiment. According to an exemplary embodiment, which is in no way intended to limit the invention, a block may include 256 pages, but could include more or less in various embodiments. Analogously, the number of channels per plane and/or the number of planes may vary depending on the desired embodiment.

Referring still to FIG. 4, all pages in a block-stripe with the same page index denote a page-stripe. For example, Page-stripe 0 includes the first page (Page 0) of each channel in Block-stripe 0 of Plane 0. Similarly, Page-stripe N includes the last page (Page N) of each channel in Block-stripe 0 of Plane 0.

As previously mentioned, any of the embodiments described herein may implement heat tracking and/or segregation of data, e.g., using a memory controller. Specifically, according to some embodiments, the temperature of a datum (e.g., a 4 KiB (kibibyte) logical page, physical page, a non-volatile memory block, a block-stripe, etc.) in the context of heat segregation may be categorized based on the update frequency of that datum. However, heat tracking and/or segregation may include a variety of design choices. For example, the granularity of a datum at which heat (temperature) is tracked, the resolution of the heat, the procedure used to update the heat, the resolution at which data segregation is performed (e.g., the number of streams), and/or the mapping of one or more heat values to a given stream may be designated as modifiable design parameters in a heat segregating scheme.

Specifically, different embodiments herein may include a modification to the data placement policy of the incoming user data, which may desirably achieve improved separation of data streams. A data stream with a lower heat value typically corresponds to a lower write rate while a data stream with a higher heat value typically corresponds to a higher write rate. Accordingly, the inventors discovered that a stream with a lower heat value may have a smaller buffer size without resulting in an observable difference in system performance. This discovery may be represented analytically by Equation 1 below.

$$\text{StreamPlanes}(i)/\text{TotalPlanes} = \text{StreamThroughput}(i)/\text{MaxThroughput} \quad \text{Equation 1}$$

Equation 1 illustrates that the number of planes (StreamPlanes(i)) assigned to a given data stream (i) is preferably large for data streams having a high throughput StreamThroughput(i). However, a colder stream of data is expected to have lower throughput StreamThroughput(i). It follows that the number of planes StreamPlanes(i) assigned to a colder stream of data may be less than the number assigned to a stream of hotter data. As alluded to above, various embodiments herein may implement an adaptive assignment of open LEBs to incoming data streams, preferably such that colder (e.g., smaller) streams of data have fewer open LEBs, and hotter (e.g., larger) streams of data have more open LEBs. Moreover, it should be noted that the number of planes StreamPlanes(i) assigned to a given data stream (i) may correspond (e.g., at least approximately) to the size of the associated buffer that is allocated to the given data stream i, e.g., DRAM buffer. This also holds for host streams and/or for relocation streams. As with host streams described above, the throughput of host and relocation streams depend on workload characteristics such as skewness, the access pattern, and device characteristics. It is well understood for one skilled in the art that this is also the case for the relative heat level between host and relocation streams. The write rates of each stream can for example be estimated from the current write amplification and/or the overprovisioning. The write rates may also be determined from monitoring individual stream throughputs in the background directly. In this case, the buffer size of a data stream may be adapted according to the estimated and/or measured rate. Also note that while certain host and relocation streams may actually have the similar throughput and heat level characteristics, the streams still deserve to be maintained separately because these similarities may only be valid for a limited amount of time due to workload changes and/or these similarities may be desirable from a garbage collection point of view.

The actual size of the DRAM buffer associated to each LEB of all streams may actually be significantly smaller than the capacity of an entire LEB. It may be sufficient to size the buffer to hold only a small number of page-stripes, e.g., such that write latency to memory (e.g., Flash) as well as potential destage conflicts to the same plane may be hidden. The destaging of data from the DRAM buffers to memory may then be performed page-stripe by page-stripe. Once a page-stripe has been successfully destaged, the buffer can be reused to accommodate writes to a new page-stripe in the LEB. Alternative embodiments may not have a DRAM buffer for destaging and may write directly to memory.

Figure 5:
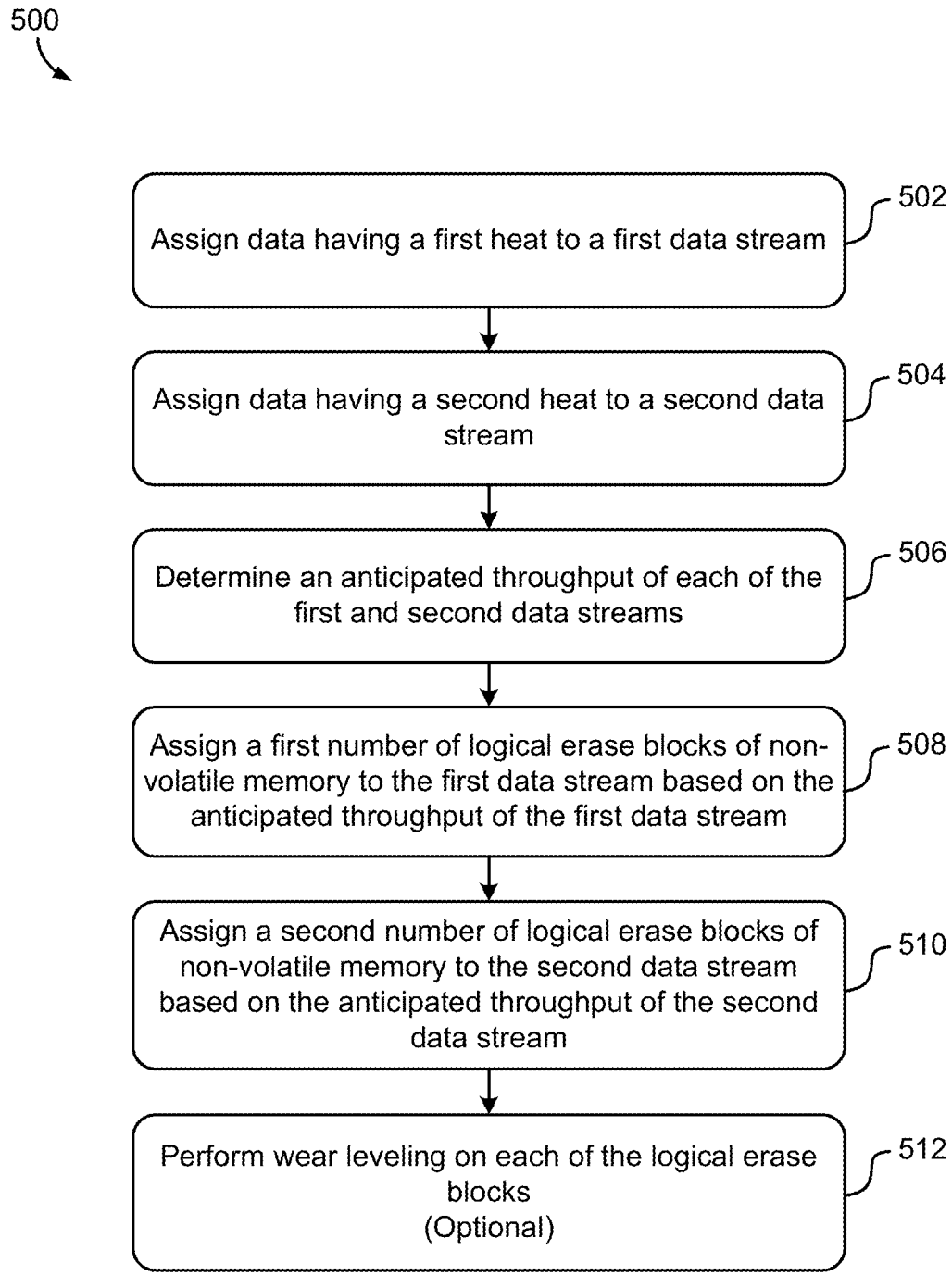
FIG. 5 is a flowchart of a method for assigning open LEBs to incoming data, in accordance with one embodiment.

FIG. 5 includes a flowchart of a method 500 for assigning open LEBs to incoming data in accordance with one embodiment. The method 500 may be performed in accordance with the present invention in any of the environments depicted in FIGS. 1-4, among others, in various embodiments. Of course, more or less operations than those specifically described in FIG. 5 may be included in method 500, as would be understood by one of skill in the art upon reading the present descriptions.

Each of the steps or operations of the method 500 may be performed by any suitable component of the operating environment. For example, in various embodiments, the method 500 may be partially or entirely performed by a controller, a processor, etc., or some other device having one or more processors therein. The processor, e.g., processing circuit(s), chip(s), and/or module(s) implemented in hardware and/or software, and preferably having at least one hardware component, may be utilized in any device to perform one or more steps or operations of the method 500. Illustrative processors include, but are not limited to, a CPU, an ASIC, a FPGA, etc., combinations thereof, or any other suitable computing device known in the art.

As shown in FIG. 5, method 500 includes operation 502 where data having a first heat is assigned to a first data stream, and operation 504 where data having a second heat is assigned to a second data stream. As described above, the heat associated with a given data stream may be determined, at least in part, based on an update frequency of the data stream. The heat of a given data stream may be determined "on the fly", predetermined and stored in memory (e.g., to be accessed at a later time), etc.

Depending on the approach, the difference in heat separating the first and second heats may vary. For example, in some approaches, data assigned to the first heat may be "very hot" while the data assigned to the second heat may be "very cold", while in other approaches, data assigned to the first heat may be "hot" while the data assigned to the second heat may be "cold". In still other approaches, data assigned to the first heat may be "warm" while the data assigned to the second heat may be "cool". It follows that the performance of operations 502 and/or 504 may vary depending on the data being assigned.

With continued reference to method 500, operation 506 includes determining an anticipated throughput of each of the first and second data streams. Depending on the application, the anticipated throughput of a given data stream may be determined in a number of different ways. For example, the anticipated throughput of a given data stream may be determined at system design time, at system startup, during runtime (operation), when a new data stream is received, etc. According to one case, at system startup, when actual throughputs of newly received data streams are not available, the anticipated throughputs of these newly received data streams may be used to determine an appropriate number of LEBs and/or memory buffer space to assign to each data stream at an outset. Depending on the approach, the anticipated throughputs for newly received data streams may be read from a table, determined based on previous counts, estimated based on expected target workloads on the device, etc. However, in other approaches, anticipated throughputs of various data streams may be determined using any process which would be apparent to one skilled in the art upon reading the present description.

According to another example, the anticipated throughput of the data streams may be determined in order to facilitate dynamic adjustments to the number of LEBs and/or amount of buffer space that has been assigned to one or more of the data streams. During operation, the actual throughput of a given data stream may deviate from an initially anticipated throughput thereof. In such instances, it may be desirable for an updated anticipated throughput to be determined (e.g., based on the performance of the data stream up to that point) and used to adjust the number of LEBs and/or amount of buffer space assigned to one or more of the data streams. Accordingly, while the system is running, an updated anticipated throughput of each of the data streams may be determined based on a measurement of one or more of a temporal stream throughput, e.g., short-term stream throughput, a relatively longer long-term stream throughput; stream stall events of the first and/or second data streams; a current workload (e.g., current write amplification); overprovisioning; etc. Further description is provided below in reference to FIG. 8.

Referring again to FIG. 5, operation 508 includes assigning a first number of LEBs of non-volatile memory (e.g., such as NAND Flash memory) to the first data stream based on the anticipated throughput of the first data stream, while operation 510 includes assigning a second number of LEBs of non-volatile memory to the second data stream based on the anticipated throughput of the second data stream. As described above, it is preferred that a greater number of LEBs are assigned to data streams having greater anticipated throughputs, while a lesser number of LEBs are assigned to data streams having lesser anticipated throughputs. It is also preferred, but in no way required, that the first and/or second numbers of LEBs assigned to the first and/or second data streams are at least approximately proportional to the anticipated throughputs thereof. Moreover, LEBs are preferably assigned to the data streams in a first-come-first-served fashion, as will be described in further detail below (e.g., see FIG. 8).

Furthermore, method 500 includes optional operation 512 where wear leveling is performed on each of the LEBs. Wear leveling may include performing different steps to ensure that the "health" value of each LEB (e.g., indicative of the wear level thereof) remains balanced across the device. In doing so, operation 512 may desirably ensure that the LEBs wear at about an even rate, thereby preventing premature exhaustion of any of the LEBs. An illustrative process of performing wear leveling on each of the LEBs is presented in the sub-processes of optional operation 512 shown in FIG. 6.

Figure 6:
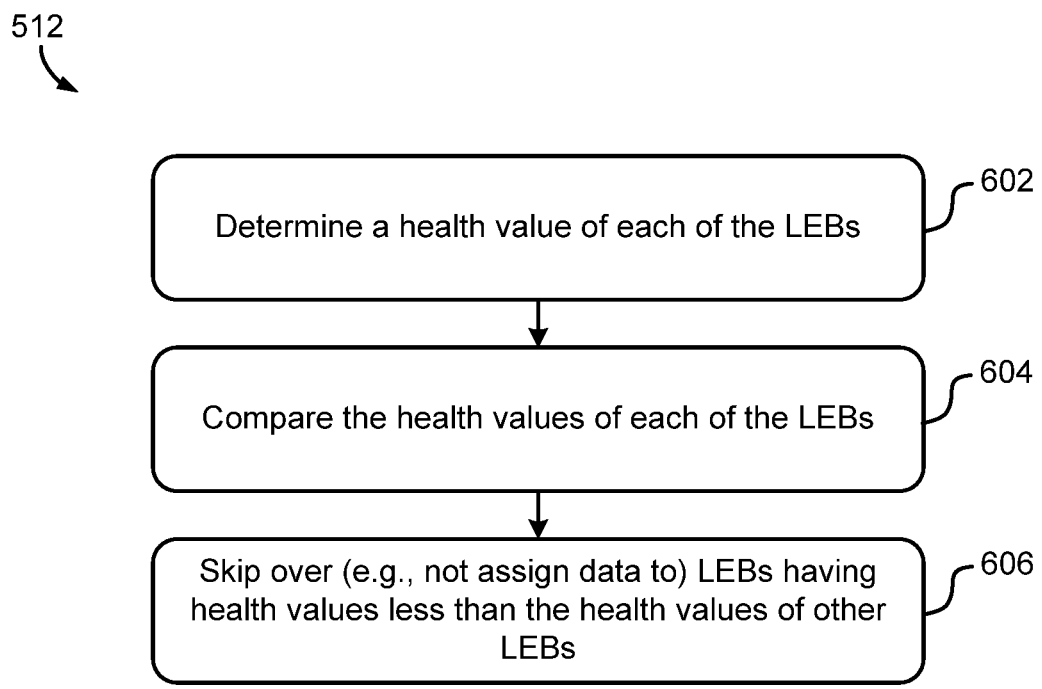
FIG. 6 is a flowchart of sub-processes for an optional wear-leveling operation in the method of FIG. 5, in accordance with one embodiment.

Looking to FIG. 6, sub-process 602 includes determining a health value of each of the LEBs (e.g., indicative of the wear level thereof). According to one example, determining a health value of a given LEB may be based, at least in part, on an amount of time, a number of erase cycles, a number of write operations, a number of read operations, a number of correctable errors, etc. experienced by the LEB.

Moreover, sub-process 604 includes comparing the health values of the LEBs, while sub-process 606 includes skipping over (e.g., not assigning data to) LEBs having health values less than the health values of other LEBs, e.g., by a predetermined amount, by a dynamic value, by a user-defined threshold, etc. The health value of a particular LEB may be compared against an average health value of the other LEBs, a median health value of the other LEBs, a minimum health value of the other LEBs, etc., depending on the desired embodiment.

An LEB determined to have a health value sufficiently less than other LEBs may be skipped over (e.g., temporarily deactivated) for an amount of time, for a number of garbage collections, until the health value thereof matches and/or rises above the health values of the other LEBs. By skipping over LEBs having health values less than other ones of the LEBs, operation 512 may be able to prevent uneven wear of the LEBs. According to an exemplary embodiment, which is in no way intended to limit the invention, firmware may be used to dynamically skip over certain ones of the data streams, e.g., depending on the effective health thereof. However, different health levels may be dealt with accordingly, depending on the desired approach.

Additional techniques of wear leveling are discussed in more detail below.

It should be noted that although method 500 only refers to first and second data streams, a greater number of data streams may be supported in a similar manner, depending on the embodiment. According to various embodiment, the number of supported data streams may vary depending on the amount of open LEBs, the size of the buffer, the amount of data being assigned, the number of and/or difference between the heat levels associated with the data being assigned, etc. According to one example, data may be assigned to six unique data streams as shown in FIG. 7 below.

Figure 7:
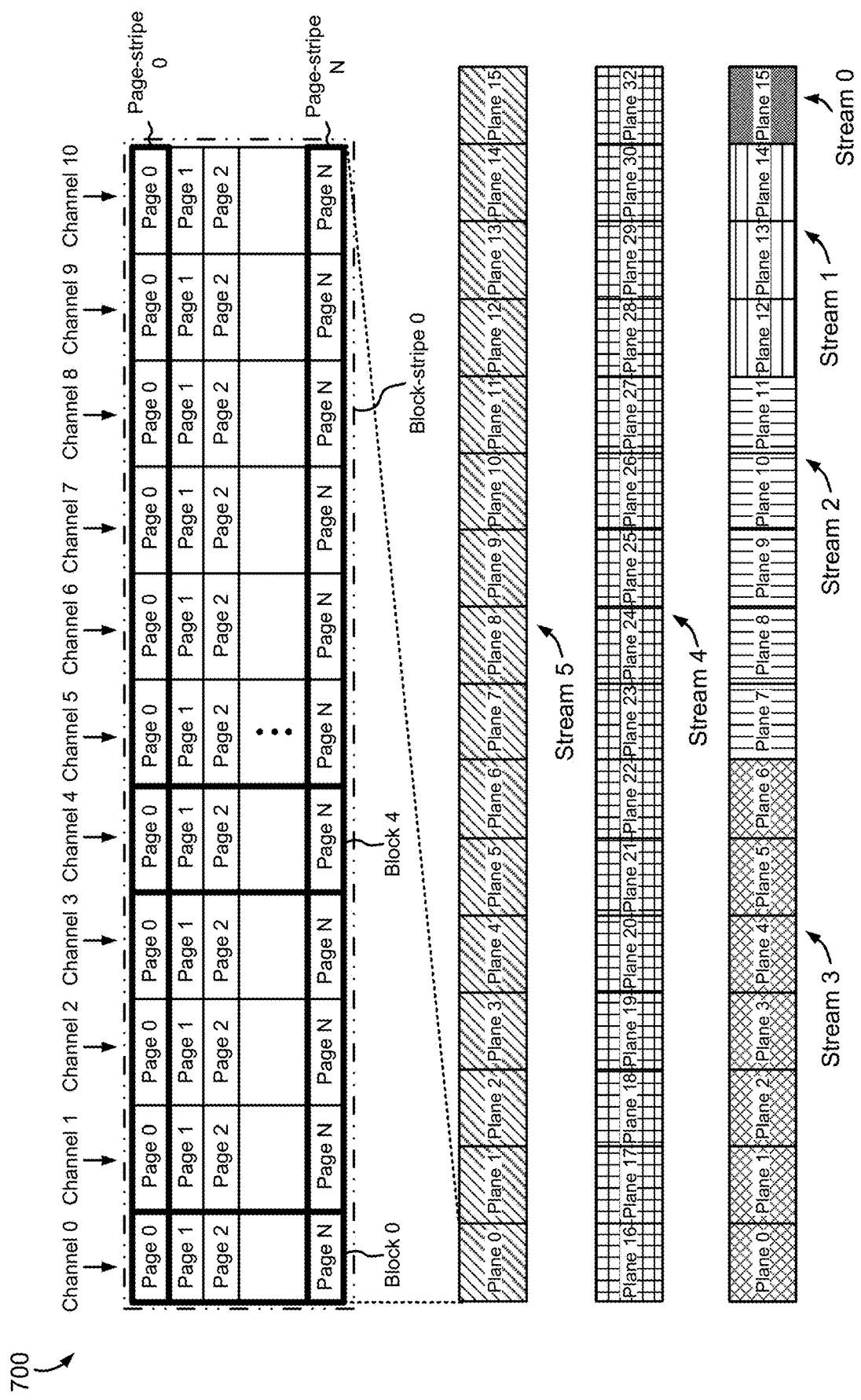
FIG. 7 is a high level illustration of non-volatile memory, in accordance with one embodiment.

FIG. 7 illustrates a high level illustration 700 of non-transitory memory in accordance with one embodiment. As an option, the present high level illustration 700 may be implemented in conjunction with features from any other embodiment listed herein, such as those described with reference to the other FIGS., such as FIGS. 4-5. The exemplary high level illustration 700 in FIG. 7 corresponds to the illustrative process of assigning the different sections of open LEBs to the different data streams as seen in method 500 of FIG. 5 and/or the sub-processes of FIG. 6. Moreover, FIG. 7 illustrates variations of the embodiment of FIG. 4 depicting several exemplary configurations within the planes. Accordingly, various components of FIG. 7 have common numbering with those of FIG. 4.

However, such high level illustration 700 and others presented herein may be used in various applications and/or in permutations which may or may not be specifically described in the illustrative embodiments listed herein. Further, the high level illustration 700 presented herein may be used in any desired environment. Thus FIG. 7 (and the other FIGS.) may be deemed to include any possible permutation.

Looking to FIG. 7, the high level illustration 700 includes plane-level views of non-transitory memory. As previously described, each plane includes eleven blocks (Block 0 through Block 10), each having N+1 pages. Moreover, in the present embodiment, each plane stripe includes a plurality of LEBs. Moreover, each plane of the plane stripe includes multiple LEBs, one of which is open (for writing), while the remaining LEBs are not open (cannot be written to) at the moment, e.g., due to performance reasons.

Here, data has been assigned to six different data streams. As mentioned above, data is preferably assigned to a data stream based on its heat (e.g., see operations 502, 504 above). Thus, data assigned to the same data stream preferably has at least a similar heat, while the heat of data compared across each of the data streams is preferably different.

After data has been assigned to data streams, an anticipated throughput of each of the data streams is preferably determined (e.g., see operation 506 above). Moreover, as mentioned above, the number of open LEBs assigned to each of the data streams may depend on the anticipated throughput determined for each of the data streams.

Referring still to the exemplary embodiment of FIG. 7, the anticipated throughputs of Stream 5 and Stream 4 were determined to be about equal, and greater than the anticipated throughputs of Stream 3, Stream 2, Stream 1 and Stream 0. Accordingly, Stream 5 and Stream 4 were assigned a greater number of LEBs (and a greater amount of buffer space) than Stream 3, Stream 2, Stream 1 and Stream 0. Furthermore, each of Stream 3, Stream 2, Stream 1 and Stream 0 were assigned a respective number of LEBs depending on each of their respective anticipated throughputs (e.g., probability of writes). Again, it is preferred, but in no way required, that the number of LEBs assigned to each of the data streams is at least approximately proportional to the anticipated throughput thereof. For example, the probability of data throughput of each data stream may be estimated based on expected target workloads on the device and used to determine the number of open LEBs to assign thereto. Similarly, the expected target relocation rates may be estimated based on the expected target workload on the device to determine the number of LEBs to assign to relocation streams.

Referring still to the embodiment illustrated in FIG. 7, Plane 0 through Plane 31 assigned to Stream 5 and Stream 4 respectively are fully independent with respect to each other and may be written to in parallel from the corresponding data streams. However, the assignment of Plane 0 through Plane 15 to Stream 5 overlaps with the assignment of Plane 0 through Plane 15 to Stream 3 through Stream 0 respectively. It follows that in the present exemplary embodiment, which is in no way intended to limit the invention, no two streams can access (e.g., write to and/or read from) the same plane concurrently (e.g., on Flash). For example, Stream 3 is blocked from writing to Plane 0 when Stream 5 is writing thereto. Similarly, Stream 5 cannot write to Plane 12 while Stream 1 is writing thereto. However, it should be noted that this writing limitation may be restricted to approaches which include accessing Flash. For example, similar writing limitations may not hinder access to DRAM where the write operations are staged. Therefore this apparent limitation may only impact the destaging timings of data from DRAM to memory (e.g., Flash).

However, in other embodiments, open planes may not overlap and/or conflict with each other. According to some approaches, the design may be such that all planes can be written in parallel to memory (e.g., Flash). In other words, overlapping may not exist in some embodiments.

According to some approaches, the number of LEBs may be statically assigned to each of the data streams. For example, looking to the high level illustration 700 of FIG. 7, the number of open LEBs assigned to each of the data streams may remain fixed, e.g., regardless of fluctuations in throughput and/or other performance characteristics of the data streams during operation. In some approaches, the number of open LEBs for each of the data streams may be determined and statically assigned when the corresponding system is powered up from a dormant state (turned on), or a time soon thereafter. According to other approaches, the number of open LEBs for each of the data streams may be determined and statically assigned upon receiving a first stream of data, receiving a first read request, receiving a user request, after a predetermined amount of time, etc., depending on the desired embodiment.

Moreover, because the number of LEBs assigned to each of the data streams is preferably about proportional to the anticipated throughput thereof, a unique number of open LEBs may be assigned to the respective data streams each time this determination is made. However, depending on the manner in which the number of open LEBs for each of the data streams is determined and/or assigned, the number of LEBs assigned to each data stream may be stored in memory and implemented again at a later time for data streams having the same or similar anticipated throughputs.

Although the above description deals with static assignments of LEBs to data streams, embodiments described herein may include more of a dynamic approach to LEB (and buffer) assignments to data streams. In other words, the mapping of data streams to planes is not limited to being implemented statically.

Figure 8:
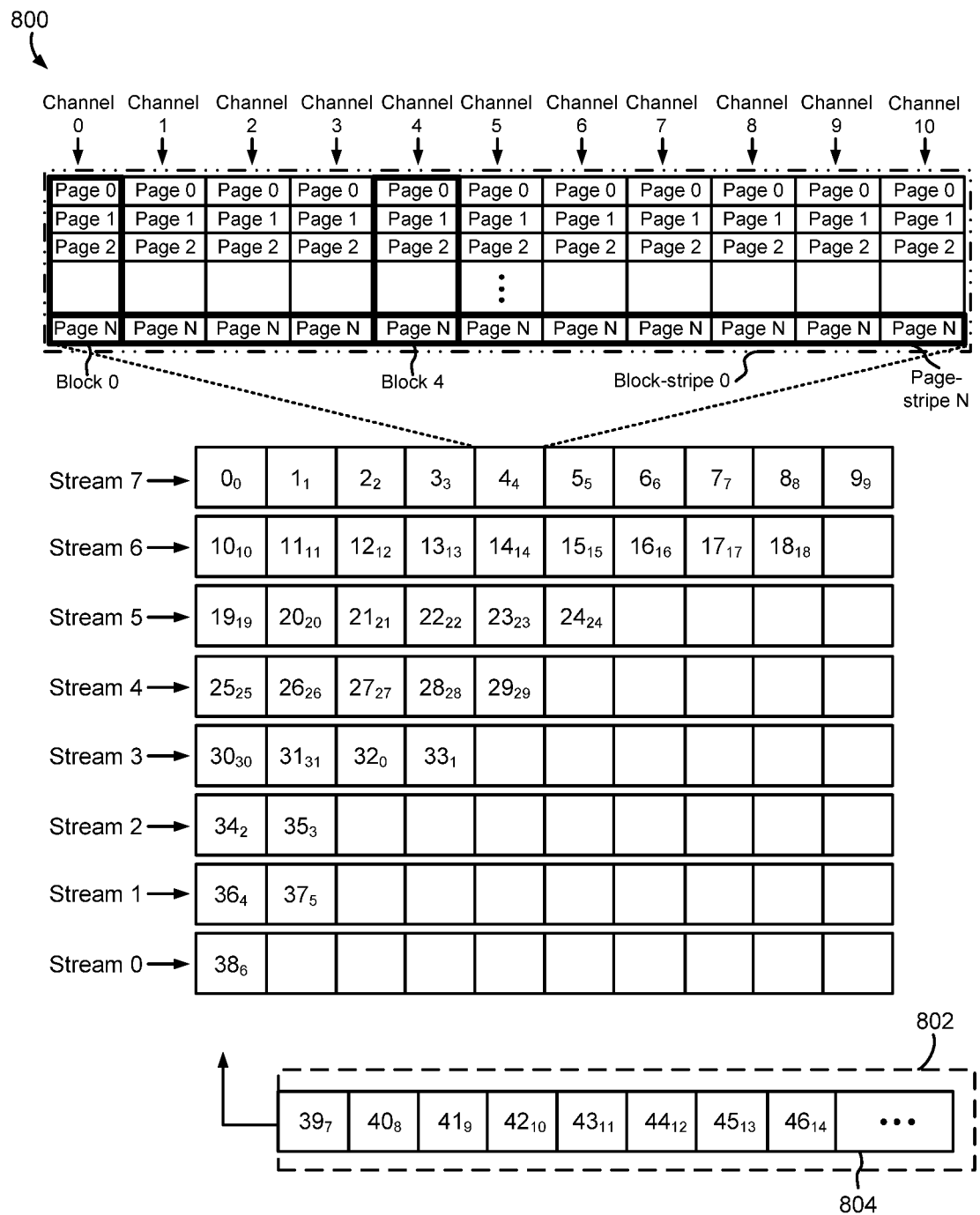
FIG. 8 is a high level illustration of non-volatile memory, in accordance with another embodiment.

FIG. 8 illustrates a high level illustration 800 of non-transitory memory in accordance with one embodiment. As an option, the present high level illustration 800 may be implemented in conjunction with features from any other embodiment listed herein, such as those described with reference to the other FIGS., such as FIGS. 4-5. The exemplary high level illustration 800 in FIG. 8 corresponds to the illustrative process of assigning the different sections of open LEBs to the different data streams as seen in methods 500, 512 of FIGS. 5-6. Moreover, FIG. 8 illustrates variations of the embodiment of FIG. 4 depicting several exemplary configurations within the planes. Accordingly, various components of FIG. 8 have common numbering with those of FIG. 4.

However, such high level illustration 800 and others presented herein may be used in various applications and/or in permutations which may or may not be specifically described in the illustrative embodiments listed herein. Further, the high level illustration 800 presented herein may be used in any desired environment. Thus FIG. 8 (and the other FIGS.) may be deemed to include any possible permutation.

Looking to FIG. 8, the high level illustration 800 includes plane-level views of non-transitory memory. In the present embodiment, each aggregated plane includes a plurality of LEBs, but only a small number of block stripes per aggregated plane are open (for writing), while the remaining LEBs are not open (cannot be written to) at the moment, e.g., due to performance reasons. Furthermore, as previously described, LEBs of each aggregated plane include eleven blocks, one from the same physical plane on each channel, each having N+1 pages.

As shown, eight data streams are supported in the present embodiment (Stream 0 through Stream 7), where each of the data streams may have a different number of open LEBs assigned thereto. Moreover, the present embodiment includes 32 independent planes represented here as indexes of LEB numbers implementing the following format: LEB $_{PLANE}$, where the base number represents the number of the LEB and the subscript represents the plane which the LEB is associated with. For example, $34_2$ assigned to Stream 2 represents LEB 34 from Plane 2 (not shown), as would be appreciated by one skilled in the art upon reading the present description.

$0_0$ through $31_{31}$ assigned to Stream 7 through Stream 3 respectively are fully independent and may be written to in parallel from the corresponding data streams. However, Stream 7 overlaps planes of some LEBs with Stream 3 through Stream 0. Specifically, the assignment of $0_0$ through $6_6$ to Stream 7 overlap with the assignment of $32_0$ through $38_6$ to Stream 3 through Stream 0 respectively. In other words, aggregated planes 0 to 6 have two open LEBs and aggregated planes 7 to 31 have a single open LEB. However, other embodiments may have the same number of open LEBs for all planes.

Although incoming host writes from more than one data stream may be placed into DRAM buffers at the same time, in the current embodiment, no two streams can destage to memory (e.g., Flash) the same plane concurrently. Therefore some data streams may stall in the event of a conflict. For example, Stream 2 will be blocked from destaging $34_2$ to memory when Stream 7 is also concurrently destaging $2_2$ to memory. However, writes can be accepted into the DRAM buffer for Stream 2 during the destage operation of LEB $2_2$.

Although the embodiment illustrated in FIG. 8 includes overlapped assignments of LEBs to data streams, in other embodiments, all open LEBs may be written in parallel without any stalls, as would be appreciated by one skilled in the art upon reading the present description. As mentioned above, overlapping may not exist in some embodiments.

The number of LEBs (and the associated size of the buffer) assigned to a data stream may indicate the maximum throughput that the data stream may achieve. The higher the number of LEBs assigned to the data stream, the higher the maximum achievable throughput for the data stream. As described above, the number of LEBs assigned to a given data stream at an outset may be determined based, at least in part, on the initial anticipated throughput thereof. However, as characteristics (e.g., the throughput) of a data stream change over time and deviate from an initially anticipated throughput thereof, the number of LEBs assigned to the data stream may be adjusted dynamically, e.g., adaptively. In such instances, it may be desirable for an updated anticipated throughput to be determined (e.g., based on the performance of the data stream up to that point) and used to adjust the number of LEBs and/or amount of buffer space assigned to one or more of the data streams. Accordingly, while the system is running, an updated anticipated throughput of each of the data streams may be determined (e.g., see operation 506 above) after an amount of time has passed, upon request, in response to predetermined conditions being met, etc. According to preferred approaches, this dynamic adjustment of the number of LEBs and/or amount of buffer space assigned to one or more of the data streams may be based on a measurement of one or more of a temporal stream throughput, e.g., short-term stream throughput, a relatively longer long-term stream throughput; stream stall events of the first and/or second data streams; a current workload; etc.

For example, short-term measurements of stream throughput may be utilized to quickly change the number of open LEBs assigned to data streams corresponding to high-throughput. Moreover, long-term measurements of stream throughput may be used to change the number of open LEBs assigned to data streams more slowly, thereby reducing the probability of assigning a large number of open LEBs to data streams that temporarily have spikes in throughput. With reference to the present description, "short-term" may refer to any temporal throughput measured over a period of time which is at least shorter than that associated with a "long-term" temporal throughput. Depending on the desired approach, an amount of time which a short-term stream throughput and/or long-term stream throughput span may vary. The time periods associated with short- and long-term temporal throughputs may be predefined, selected by the system and/or a user, defined dynamically, etc.

Furthermore, a stream stalls when the number of assigned open LEBs is too low to accommodate the throughput of the data stream assigned thereto. In that case the DRAM buffer cannot absorb the high throughput of the data stream. It follows that a higher number of open LEBs may desirably be assigned to a data stream having a higher stall time than other streams. In contrast, a lower number of open LEBs may desirably be assigned to a data stream with lower (e.g., nearly-zero) stall time.

It should be noted that the number of open LEBs which may be assigned to one or more data streams at a time may be limited by the size of the corresponding buffer. Looking again to FIG. 8, the present embodiment may assign 39 LEBs (LEB 0 through LEB 38) at a time to the various data streams. Accordingly, when the number of LEBs assigned to one or more of the given data streams increases by an amount, the number of LEBs assigned to the other data streams are decreased by a sum equal to the amount increased. For example, Stream 5 in high level illustration 800 has six LEBs assigned thereto. Following the current example, the number of LEBs assigned to Stream 5 may be increased by three (to a total of nine) in response to determining that the stream throughput, number of stream stall events, current workload, etc. has increased from a previous value. Consequently, the number of LEBs assigned to the other data streams is reduced by a total of three to remain within the limit of 39 assigned LEBs. For instance, the number of LEBs assigned to Stream 3 may be reduced by two while the number of LEBs assigned to Stream 4 may be reduced by one, e.g., in response to the stream throughput, number of stream stall events, current workload, etc. of Stream 3 and Stream 4 having been reduced from previous values.

By dynamically adjusting the number of LEBs assigned to each data stream, improved performance may be achieved for a wide variety of workloads, including workloads not targeted by product design. The assignment of open LEBs to streams is preferably performed such that the overall system performance is improved and/or the separation of streams is increased. In an ideal situation, a single LEB may hold only a single stream.

Wear Leveling

As mentioned above, wear leveling may be performed on the LEBs. Wear leveling may include performing different steps to ensure a "health" value of each LEB (e.g., indicative of the wear level thereof) remains about even. In doing so, an implementation may desirably ensure that the LEBs wear at about an even rate, thereby preventing premature exhaustion of any of the LEBs.

The selection of LEBs (here planes) that will be assigned, and written, to by a stream is important for achieving effective wear leveling. For example, referring again to FIG. 8, if a plane (say Plane 0) is assigned to a very hot data stream much more frequently than other planes, then that Plane 0 will experience much more writes, and thus program-erase cycles as well, than the other planes. As a result, Plane 0 will become more worn out more quickly than the other planes.

Accordingly, it is preferred, but in no way required, that the embodiments described herein implement a round-robin iteration over planes. Moreover, a first-come-first-served (FCFS) policy may be implemented for assigning LEBs to data streams.

Flash controller 802 queues erased LEBs which have not yet been assigned to data streams. In particular, each time a Flash controller 802 needs more erased LEBs to write to, an erased LEB from each plane is queued to the Flash controller 802. For example, another set of open LEBs may be fetched from the ready queue 804 of the Flash controller 802 and supplied to a data stream that has been fully written out to memory (e.g., Flash). These LEBs may be stored in a "ready" queue 804 in the Flash controller 802. When a data stream requests LEBs, the required number of LEBs are taken from the ready queue 804 and assigned to the data stream. Accordingly, when a data stream is in need of one or more open LEBs to be assigned thereto, the desired number of LEBs are taken from the ready queue 804 in the Flash controller 802, preferably in a FCFS fashion, and assigned to the appropriate data stream. At this point the LEB may be considered open to accept writes (e.g., from a host). As illustrated, the queued LEBs are preferably from different planes (denoted by the different subscripts) to achieve increased parallelism. With this approach, different planes will see a similar number of writes and program-erase cycles. In case that one or more planes have a lower estimated remaining health (e.g., compared to an average health value, a median health value, a maximum health value, etc. of the other LEBs and/or planes), they may simply be skipped when queuing for writes to the Flash controller 802. As mentioned above, one or more LEBs determined to have health values sufficiently less than other LEBs may be skipped over (e.g., temporarily deactivated) for an amount of time, for a number of garbage collections, until the health value thereof matches and/or rises above the health values of the other LEBs. By skipping over the one or more LEBs determined to have health values sufficiently less than other LEBs, the health values should become balanced with the others, and the LEBs can again be queued together with the other LEBs.

As mentioned above, by implementing a FCFS assignment policy and/or a round-robin iteration over planes, wear leveling is desirably achieved across all planes of the embodiment. Thus, some of the embodiments described herein preferably queue and assign LEBs to the data streams (e.g., by a controller) in a round-robin fashion across all planes of the non-volatile memory. Moreover, assigning LEBs to the data streams in a first-come-first-served fashion is also preferred, e.g., as illustrated in FIG. 8.

In sharp contrast to previous implementations, various embodiments described and/or suggested herein include assigning an arbitrary number of streams to a set of LEBs. As a result, impact to the observed system throughput is minimized, which is achieved while also avoiding an undesired increase to the size of the reserved DRAM buffer. As explained above, this may be achieved by implementing an adaptive assignment of open LEBs to the identified data streams, e.g., such that colder (e.g., smaller) data streams have fewer open LEBs assigned thereto, and hotter (e.g., larger) data streams have more open LEBs assigned thereto. Thus, the heat of the data being stored in memory may determine the location it is written to.

In addition to the features presented above, memory controllers may buffer incoming data (writes) to a write cache, e.g., per data stream and corresponding to an associated page. After a desired amount of data is buffered in cache (e.g., an amount of data capable of achieving parallelism), the data may be written to non-volatile memory such as NAND Flash memory. The organization of the write cache may vary depending on the desired embodiment, as would be appreciated by one skilled in the art upon reading the present description. Thus, it follows that any of the teachings presented herein may be applied to various types of write caches, and even to systems that do not have a write cache. In other words, the embodiments described and/or suggested herein may be applied to various types of write caches and/or systems which write user data directly to memory, e.g., without buffering the user data first in a write cache.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a RAM, a ROM, an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

Figure 9:
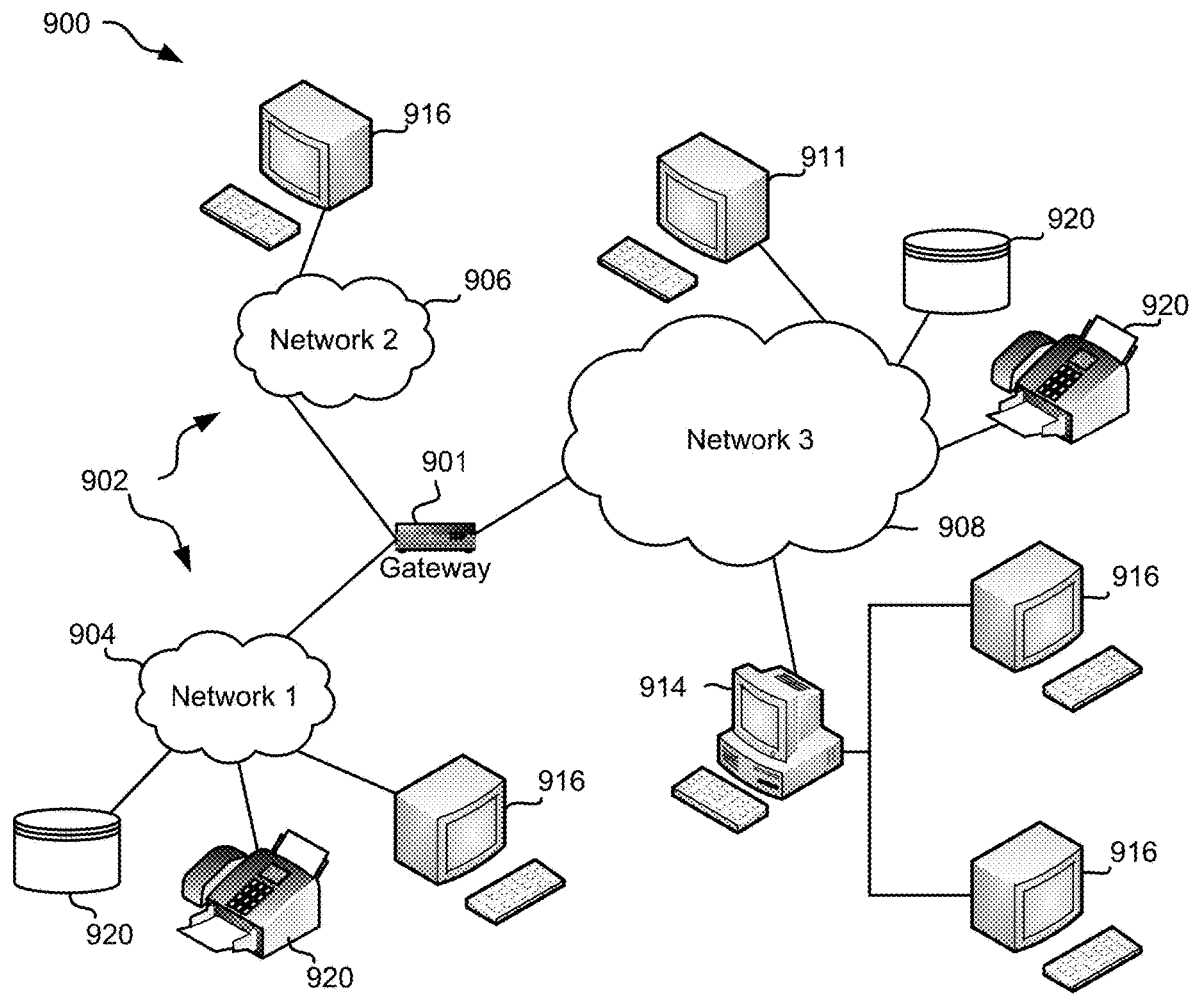
FIG. 9 is a network architecture, in accordance with one embodiment.

FIG. 9 illustrates a network architecture 900, in accordance with one embodiment. As shown in FIG. 9, a plurality of remote networks 902 are provided including a first remote network 904 and a second remote network 906. A gateway 901 may be coupled between the remote networks 902 and a proximate network 908. In the context of the present network architecture 900, the networks 904, 906 may each take any form including, but not limited to a LAN, a WAN such as the Internet, public switched telephone network (PSTN), internal telephone network, etc.

In use, the gateway 901 serves as an entrance point from the remote networks 902 to the proximate network 908. As such, the gateway 901 may function as a router, which is capable of directing a given packet of data that arrives at the gateway 901, and a switch, which furnishes the actual path in and out of the gateway 901 for a given packet.

Further included is at least one data server 914 coupled to the proximate network 908, and which is accessible from the remote networks 902 via the gateway 901. It should be noted that the data server(s) 914 may include any type of computing device/groupware. Coupled to each data server 914 is a plurality of user devices 916. Such user devices 916 may include a desktop computer, laptop computer, handheld computer, printer, and/or any other type of logic-containing device. It should be noted that a user device 911 may also be directly coupled to any of the networks, in some embodiments.

A peripheral 920 or series of peripherals 920, e.g., facsimile machines, printers, scanners, hard disk drives, networked and/or local data storage units or systems, etc., may be coupled to one or more of the networks 904, 906, 908. It should be noted that databases and/or additional components may be utilized with, or integrated into, any type of network element coupled to the networks 904, 906, 908. In the context of the present description, a network element may refer to any component of a network.

According to some embodiments, methods and systems described herein may be implemented with and/or on virtual systems and/or systems which emulate one or more other systems, such as a UNIX system which virtually hosts a MICROSOFT WINDOWS environment, etc. This virtualization and/or emulation may be enhanced through the use of VMWARE software, in some embodiments.

In other embodiments, one or more networks 904, 906, 908, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used, as known in the art.

Figure 10:
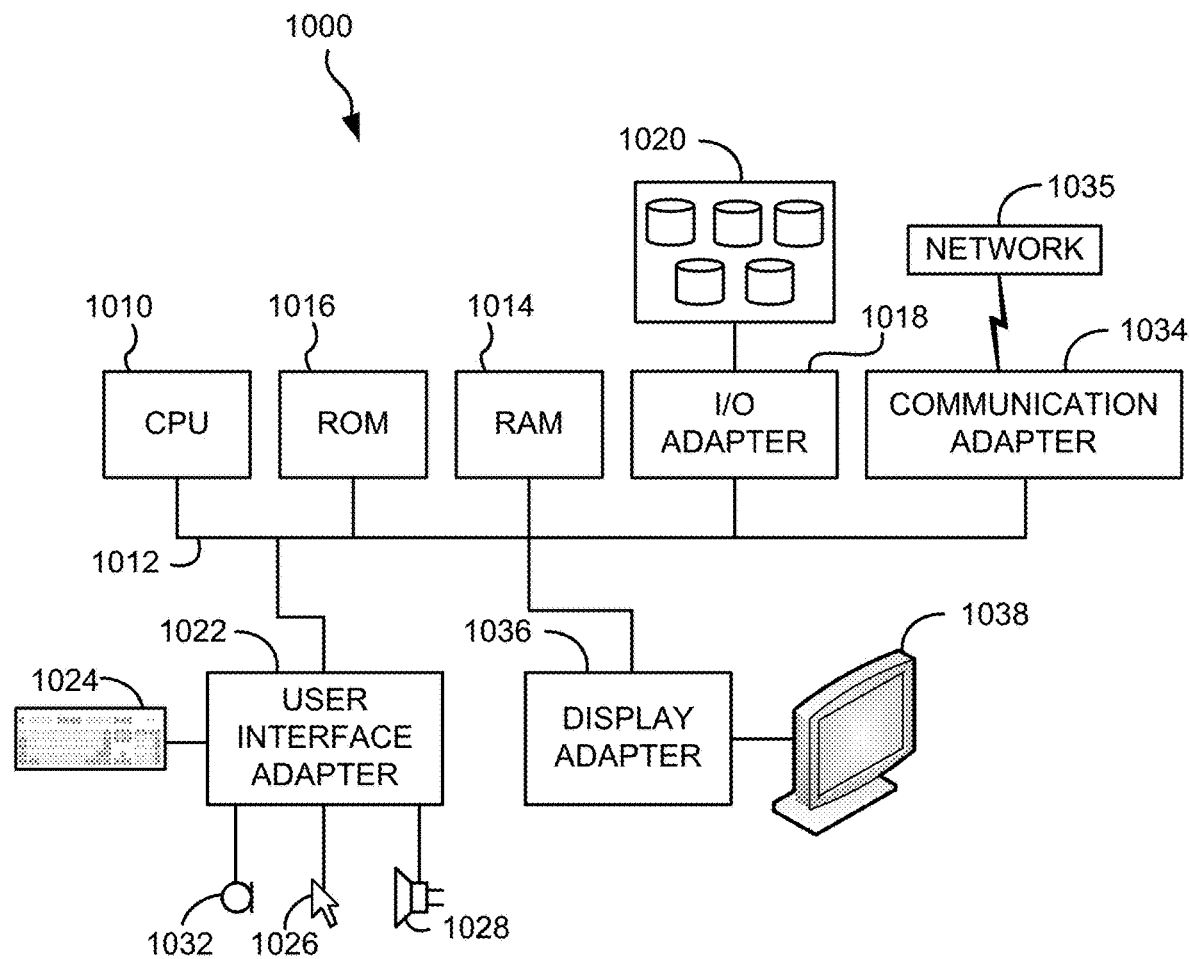
FIG. 10 is a representative hardware environment that may be associated with the servers and/or clients of FIG. 9, in accordance with one embodiment.

FIG. 10 shows a representative hardware environment associated with a user device 916 and/or server 914 of FIG. 9, in accordance with one embodiment. FIG. 10 illustrates a typical hardware configuration of a processor system 1000 having a central processing unit 1010, such as a microprocessor, and a number of other units interconnected via a system bus 1012, according to one embodiment. In some embodiments, central processing unit 1010 may include any of the approaches described above with reference to the one or more processors 210 of FIG. 2.

The processor system 1000 shown in FIG. 10 includes a RAM 1014, ROM 1016, and an I/O adapter 1018. According to some embodiments, which are in no way intended to limit the invention, I/O adapter 1018 may include any of the approaches described above with reference to I/O adapter 218 of FIG. 2. Referring still to processor system 1000 of FIG. 10, the aforementioned components 1014, 1016, 1018 may be used for connecting peripheral devices such as storage subsystem 1020 to the bus 1012. In some embodiments, storage subsystem 1020 may include a similar and/or the same configuration as data storage system 220 of FIG. 2. According to an example, which is in no way intended to limit the invention, storage subsystem 1020 may include non-volatile data storage cards, e.g., having NVRAM memory cards, RAM, ROM, and/or some other known type of non-volatile memory, in addition to RAID controllers as illustrated in FIG. 2.

With continued reference to FIG. 10, a user interface adapter 1022 for connecting a keyboard 1024, a mouse 1026, a speaker 1028, a microphone 1032, and/or other user interface devices such as a touch screen, a digital camera (not shown), etc., to the bus 1012.

Processor system 1000 further includes a communication adapter 1034 which connects the processor system 1000 to a communication network 1035 (e.g., a data processing network) and a display adapter 1036 which connects the bus 1012 to a display device 1038.

The processor system 1000 may have resident thereon an operating system such as the MICROSOFT WINDOWS Operating System (OS), a MAC OS, a UNIX OS, etc. It will be appreciated that a preferred embodiment may also be implemented on platforms and operating systems other than those mentioned. A preferred embodiment may be written using JAVA, XML, C, and/or C++ language, or other programming languages, along with an object oriented programming methodology. Object oriented programming (OOP), which has become increasingly used to develop complex applications, may be used.

Figure 11:
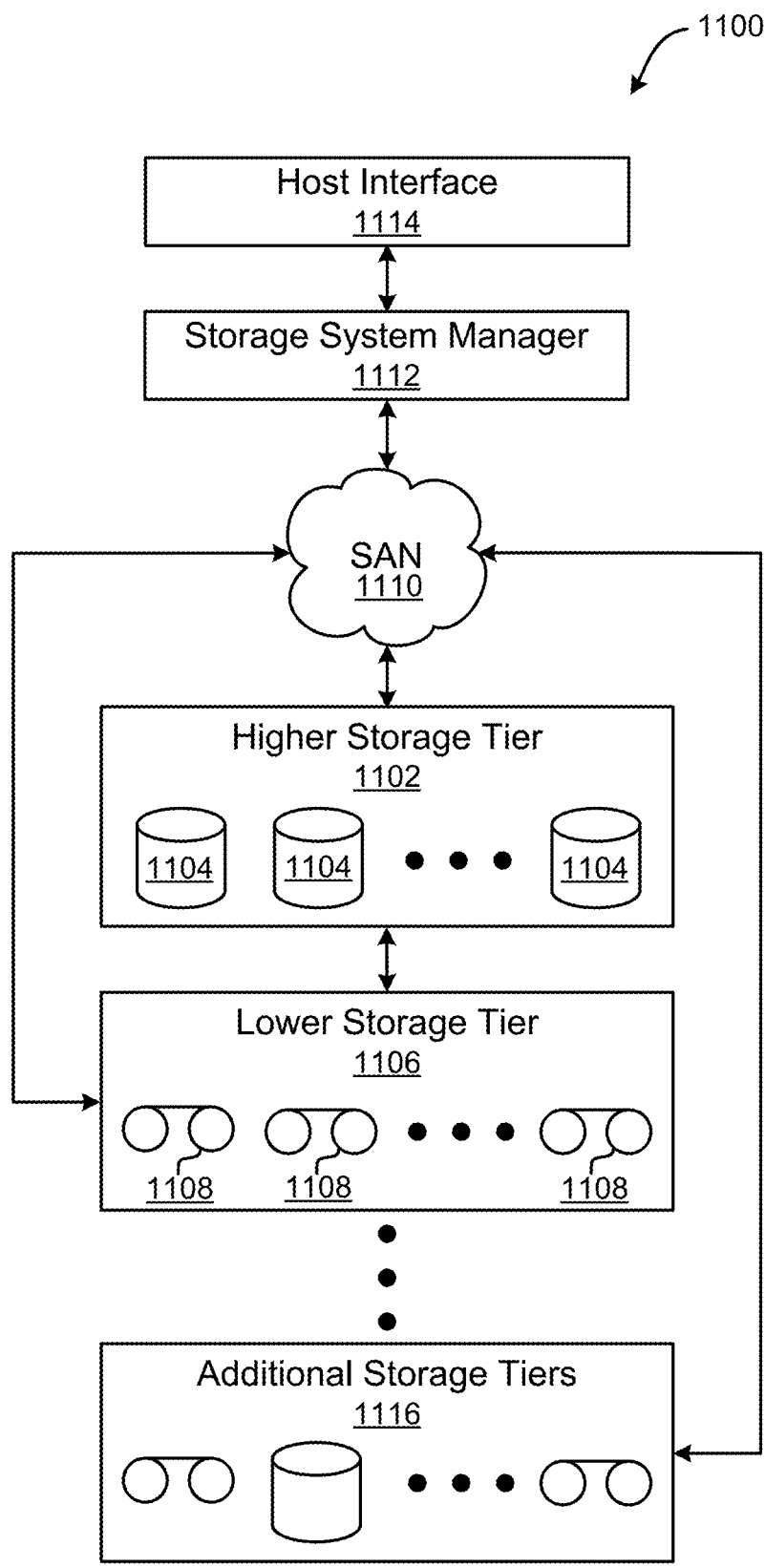
FIG. 11 is a tiered data storage system in accordance with one embodiment.

FIG. 11 illustrates a storage system 1100 which implements high level (e.g., SSD) storage tiers in combination with lower level (e.g., magnetic tape) storage tiers, according to one embodiment. Note that some of the elements shown in FIG. 11 may be implemented as hardware and/or software, according to various embodiments. The storage system 1100 may include a storage system manager 1112 for communicating with a plurality of media on at least one higher storage tier 1102 and at least one lower storage tier 1106. However, in other approaches, a storage system manager 1112 may communicate with a plurality of media on at least one higher storage tier 1102, but no lower storage tier. The higher storage tier(s) 1102 preferably may include one or more random access and/or direct access media 1104, such as hard disks, nonvolatile memory (NVM), NVRAM), solid state memory in SSDs, Flash memory, SSD arrays, Flash memory arrays, etc., and/or others noted herein or known in the art. According to illustrative examples, FIGS. 3-4 show exemplary architectures of SSD systems which may be used as a higher storage tier 1102 depending on the desired embodiment.

Referring still to FIG. 11, the lower storage tier(s) 1106 preferably includes one or more lower performing storage media 1108, including sequential access media such as magnetic tape in tape drives and/or optical media, slower accessing HDDs, slower accessing SSDs, etc., and/or others noted herein or known in the art. One or more additional storage tiers 1116 may include any combination of storage memory media as desired by a designer of the system 1100. Thus the one or more additional storage tiers 1116 may, in some approaches, include a SSD system architecture similar or the same as those illustrated in FIGS. 1-2. Also, any of the higher storage tiers 1102 and/or the lower storage tiers 1106 may include any combination of storage devices and/or storage media.

The storage system manager 1112 may communicate with the storage media 1104, 1108 on the higher storage tier(s) 1102 and lower storage tier(s) 1106 through a network 1110, such as a storage area network (SAN), as shown in FIG. 11, or some other suitable network type. The storage system manager 1112 may also communicate with one or more host systems (not shown) through a host interface 1114, which may or may not be a part of the storage system manager 1112. The storage system manager 1112 and/or any other component of the storage system 1100 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 1100 may include any number of data storage tiers, and may include the same or different storage memory media within each storage tier. For example, each data storage tier may include the same type of storage memory media, such as HDDs, SSDs, sequential access media (tape in tape drives, optical disk in optical disk drives, etc.), direct access media (CD-ROM, DVD-ROM, etc.), or any combination of media storage types. In one such configuration, a higher storage tier 1102, may include a majority of SSD storage media for storing data in a higher performing storage environment, and remaining storage tiers, including lower storage tier 1106 and additional storage tiers 1116 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 1102, while data not having one of these attributes may be stored to the additional storage tiers 1116, including lower storage tier 1106. Of course, one of skill in the art, upon reading the present descriptions, may devise many other combinations of storage media types to implement into different storage schemes, according to the embodiments presented herein.

According to some embodiments, the storage system (such as 1100) may include logic configured to receive a request to open a data set, logic configured to determine if the requested data set is stored to a lower storage tier 1106 of a tiered data storage system 1100 in multiple associated portions, logic configured to move each associated portion of the requested data set to a higher storage tier 1102 of the tiered data storage system 1100, and logic configured to assemble the requested data set on the higher storage tier 1102 of the tiered data storage system 1100 from the associated portions.

Of course, this logic may be implemented as to perform a method on any device and/or system or as a computer program product, according to various embodiments.

It will be further appreciated that embodiments of the present invention may be provided in the form of a service deployed on behalf of a customer.

The inventive concepts disclosed herein have been presented by way of example to illustrate the myriad features thereof in a plurality of illustrative scenarios, embodiments, and/or implementations. It should be appreciated that the concepts generally disclosed are to be considered as modular, and may be implemented in any combination, permutation, or synthesis thereof. In addition, any modification, alteration, or equivalent of the presently disclosed features, functions, and concepts that would be appreciated by a person having ordinary skill in the art upon reading the instant descriptions should also be considered within the scope of this disclosure.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A computer-implemented method, comprising:
assigning data having a first heat to a first data stream;
assigning data having a second heat to a second data stream;
determining an anticipated throughput of each of the first and second data streams;
assigning a first number of logical erase blocks of non-volatile memory to the first data stream based on the anticipated throughput of the first data stream;
assigning a second number of logical erase blocks of non-volatile memory to the second data stream based on the anticipated throughput of the second data stream; and
performing wear leveling on open logical erase blocks, wherein performing the wear leveling includes:
assigning at least some of the open logical erase blocks to a queue,
wherein open logical erase blocks having health values less than a health value of other logical erase blocks by a predetermined amount are skipped over during the assigning of open logical erase blocks to the queue, wherein the first and second numbers of logical erase blocks are assigned to the first and second data streams, respectively, from the queue.

2. The computer-implemented method of claim 1, wherein the first and second numbers of logical erase blocks assigned to the first and second data streams are proportional to the anticipated throughput of the first and second data streams, respectively.

3. The computer-implemented method of claim 1, wherein the first and/or second number of logical erase blocks are statically assigned to each of the first and/or second data streams such that the number of logical erase blocks assigned to the first and/or second data streams remain fixed regardless of fluctuations in throughput of the first and/or second data streams during operation.

4. The computer-implemented method of claim 1, wherein the first and/or second number of logical erase blocks assigned to the first and/or second data streams are adjusted dynamically based on a measurement of stream stall events of the first and/or second data streams.

5. The computer-implemented method of claim 3, wherein the non-volatile memory includes NAND Flash memory, and wherein the first and/or second number of logical erase blocks are statically assigned to each of the first and/or second data streams in response to receiving a first one of the first data stream and the second data stream.

6. The computer-implemented method of claim 1, wherein the logical erase blocks are assigned to the data streams in a round-robin fashion across all planes of the non-volatile memory.

7. The computer-implemented method of claim 1, comprising:
performing the wear leveling on open logical erase blocks prior to assigning the first and second numbers of logical erase blocks,
wherein performing the wear leveling includes:
determining a health value of each of the open logical erase blocks; and
comparing the determined health values.

8. The computer-implemented method of claim 7, wherein the logical erase blocks are assigned to the data streams in a first-come-first-served fashion.

9. A computer program product comprising a computer readable storage medium having program instructions embodied therewith, the program instructions readable and/or executable by a controller to cause the controller to:
assign, by the controller, data having a first heat to a first data stream;
assign, by the controller, data having a second heat to a second data stream;
determine, by the controller, an anticipated throughput of each of the first and second data streams;
assign, by the controller, a first number of logical erase blocks of non-volatile memory to the first data stream based on the anticipated throughput of the first data stream;
assign, by the controller, a second number of logical erase blocks of non-volatile memory to the second data stream based on the anticipated throughput of the second data stream; and
perform, by the controller, wear leveling on open logical erase blocks, wherein performing the wear leveling includes:
assigning at least some of the open logical erase blocks to a queue;
wherein open logical erase blocks having health values less than a health value of other logical erase blocks by a predetermined amount are skipped over during the assigning of open logical erase blocks to the queue, wherein the first and second numbers of logical erase blocks are assigned to the first and second data streams, respectively, from the queue.

10. The computer program product of claim 9, wherein the first and second numbers of logical erase blocks assigned to the first and second data streams are proportional to the anticipated throughput of the first and second data streams, respectively.

11. The computer program product of claim 9, wherein the first and/or second number of logical erase blocks are statically assigned to each of the first and/or second data streams such that the number of logical erase blocks assigned to the first and/or second data streams remain fixed regardless of fluctuations in throughput of the first and/or second data streams during operation.

12. The computer program product of claim 9, wherein the non-volatile memory includes NAND Flash memory, and wherein the first and/or second number of logical erase blocks assigned to the first and/or second data streams are adjusted dynamically based on a measurement of stream stall events of the first and/or second data streams.

13. The computer program product of claim 9, wherein the logical erase blocks are assigned to the data streams in a first-come-first-served fashion, wherein determining the anticipated throughput of each of the first and second data streams includes estimating the anticipated throughput based on expected target workloads.

14. The computer program product of claim 9, wherein the logical erase blocks are assigned to the data streams in a round-robin fashion across all planes of the non-volatile memory.

15. The computer program product of claim 9, the program instructions readable and/or executable by the controller to cause the controller to:
perform, by the controller, the wear leveling on open logical erase blocks prior to assigning the first and second numbers of logical erase blocks,
wherein performing the wear leveling includes:
determining a health value of each of the open logical erase blocks; and
comparing the health value of each of the open logical erase blocks to each other.

16. A system, comprising:
a plurality of non-volatile random access memory blocks configured to store data; and
a processor and logic integrated with and/or executable by the processor, the logic being configured to:
assign data having a first heat to a first data stream;
assign data having a second heat to a second data stream;
determine an anticipated throughput of each of the first and second data streams;
assign a first number of logical erase blocks of non-volatile memory to the first data stream based on the anticipated throughput of the first data stream;
assign a second number of logical erase blocks of non-volatile memory to the second data stream based on the anticipated throughput of the second data stream; and
perform wear leveling on open logical erase blocks, wherein performing the wear leveling includes:
assigning at least some of the open logical erase blocks to a queue;
wherein the first and/or second number of logical erase blocks are statically assigned to each of the first and/or second data streams in response to receiving a first one of the data having the first heat and the data having the second heat,
wherein open logical erase blocks having health values less than a health value of other logical erase blocks by a predetermined amount are skipped over during the assigning of open logical erase blocks to the queue, wherein the first and second numbers of logical erase blocks are assigned to the first and second data streams, respectively, from the queue.

17. The system of claim 16, wherein the first and second numbers of logical erase blocks assigned to the first and second data streams are proportional to the anticipated throughput of the first and second data streams, respectively.

18. The system of claim 16, wherein the logic is configured to:
perform the wear leveling on all open logical erase blocks prior to assigning the first and second numbers of logical erase blocks,
wherein performing the wear leveling includes:
determining a health value of each of the open logical erase blocks; and
comparing the health value of each of the open logical erase blocks to the health values of the other logical erase blocks.

19. The system of claim 18, wherein the open logical erase blocks are statically assigned to the queue in a round-robin fashion across all planes of the non-volatile memory, wherein comparing the health value of each of the open logical erase blocks includes comparing the health value of each of the open logical erase blocks to an average health value of the other logical erase blocks and/or a minimum health value of the other logical erase blocks.

\* \* \* \* \*